(12) United States Patent
Tardivat et al.

(10) Patent No.: US 7,186,776 B2
(45) Date of Patent: *Mar. 6, 2007

(54) RUBBER COMPOSITION FOR A TIRE COMPRISING A MULTIFUNCTIONAL POLYORGANOSILOXANE AS COUPLING AGENT

(75) Inventors: Jean-Claude Tardivat, Clermont-Ferrand (FR); Salvatore Pagano, Clermont-Ferrand (FR); Christel Thonier, Mozac (FR); Nathalie Guennouni, Irigny (FR)

(73) Assignee: Michelin Recherche et Technique S.A., Granges-Paccot (CH)

( * ) Notice: Subject to any disclaimer, the term of this patent is extended or adjusted under 35 U.S.C. 154(b) by 0 days.

This patent is subject to a terminal disclaimer.

(21) Appl. No.: 10/946,188

(22) Filed: Sep. 22, 2004

(65) Prior Publication Data

US 2005/0059773 A1 Mar. 17, 2005

Related U.S. Application Data

(63) Continuation of application No. 10/320,236, filed on Dec. 16, 2002, now Pat. No. 6,878,768, which is a continuation of application No. PCT/EP01/06671, filed on Jun. 13, 2001.

(30) Foreign Application Priority Data

Jun. 16, 2000 (FR) .................................. 00 07879

(51) Int. Cl.
C08K 5/5425 (2006.01)

(52) U.S. Cl. .................... 524/571; 524/575.5; 524/574; 523/212; 525/106; 525/105

(58) Field of Classification Search ................ 523/213, 523/212; 524/506, 571, 574, 575.5; 525/106, 525/105

See application file for complete search history.

(56) References Cited

U.S. PATENT DOCUMENTS

| | | |
|---|---|---|
| 3,755,351 A | 8/1973 | Zellerhoff et al. |
| 3,842,111 A | 10/1974 | Meyer-Simon et al. |
| 3,873,489 A | 3/1975 | Thurn et al. |
| 3,978,103 A | 8/1976 | Meyer-Simon et al. |
| 3,997,581 A | 12/1976 | Pletka et al. |
| 4,002,594 A | 1/1977 | Fetterman |
| 4,429,064 A * | 1/1984 | Marzola et al. ............. 523/213 |
| 4,565,873 A | 1/1986 | Lohmann et al. |
| 5,227,425 A | 7/1993 | Rauline |
| 5,484,848 A | 1/1996 | Jadamus et al. |
| 5,652,310 A | 7/1997 | Hsu et al. |
| 5,684,171 A | 11/1997 | Wideman et al. |
| 5,684,172 A | 11/1997 | Wideman et al. |
| 5,856,545 A | 1/1999 | Okawa |
| 5,900,449 A | 5/1999 | Custodero et al. |
| 6,245,834 B1 * | 6/2001 | Bomal et al. ............... 523/213 |
| 6,313,205 B1 * | 11/2001 | Chiron et al. ............... 524/262 |

FOREIGN PATENT DOCUMENTS

| | | |
|---|---|---|
| DE | 4319142 | 12/1994 |
| EP | 0501227 | 2/1992 |
| EP | 0810258 | 5/1997 |
| FR | 2094859 | 2/1972 |
| FR | 2206330 | 6/1974 |
| GB | 1310379 | 3/1973 |
| GB | 1439247 | 6/1976 |
| WO | 07/25374 | 7/1997 |
| WO | 97/25374 | * 7/1997 |
| WO | WO99/54386 | 10/1999 |
| WO | WO01/96444 | 12/2001 |

OTHER PUBLICATIONS

Martel et al., "Anhydripenicillin: a key intermediate for the stereocontrolled introduction of the 6-R-hydroxyethyl side chain of the penem and carbapenem antibiotics", Can. J. Chem., 65, pp. 2179-2181 (1987).

Shaw et al., "A simple quantitative method for the esterification of carboxylic acids," Tetrahedron Letters No. 9, pp. 689-692, 1973.

Jung et al., "Benzo[H]-1,6-naphthyridine synthesis via intramolecular diels-alder reactions of aryl oxazones: synthetic approach to 2-bromoleptoclinidinones," Heterocycles, 39, 2, pp. 767-778, 1994.

Campbell et al., "Some new fumaric acid derivatives, preparation of mixed fumarates and thiolfumarates," J. Org. Chem, 26, pp. 697-700, 1961.

Taschner et al., "Veresterungen mit hilfe von estern", Justus Liebigs Ann. Chem., 640, pp. 142-144, 1961.

(Continued)

Primary Examiner—Margaret G. Moore
(74) Attorney, Agent, or Firm—Buchanan Ingersoll & Rooney PC

(57) ABSTRACT

The present invention relates to a sulfur-cross-linkable elastomeric composition that is useful for the manufacture of tires. This elastomeric composition is based on at least one isoprene elastomer (in particular natural rubber), a reinforcing inorganic filler (in particular, silica), and an (inorganic filler/isoprene elastomer) coupling agent. The coupling agent is a multifunctional polyorganosiloxane (POS), which comprises functions denoted as "Y" and "X", wherein the Y function is at least one hydroxyl or hydrolyzable function grafted to the silicon atoms of the coupling agent and the X function is a group bearing at least one activated ethylene double bond and is grafted to the silicon atoms of the coupling agent. This POS is, in particular, a POS having an imide, acid or ester function, the ethylene double bond of which is activated by at least one adjacent carbonyl group (—C=O). The present invention further relates to a tire comprising the composition described above as well as semi-finished products for tires, in particular, treads, where the tires comprise a rubber composition according to the present invention.

40 Claims, 4 Drawing Sheets

OTHER PUBLICATIONS

Kamal et al., "Hydroxy-carbonyl compounds. Part XIV. The syntheses of some isoCoumarins," J. Chem. Soc., pp. 3375-3377, 1950.

Wassermann, Von Albert, "Die constitution der 1-Menthyl-ester der Maleinsaure", Justus Liebigs Ann. Chem., 488, pp. 211-227, 1931.

Adams et al., "Ethyl Acetonedicarboxylae (Glutaric acid, β-oxo-, diethyl ester)", Org. Syn. Coll., vol. 1, pp. 237 and 451, 1941.

Tanner et al., "Oxidative decarboxylation. On the mechanism of the potassium persulfate promoted decarboxylation reaction," J. Org. Chem., 52, pp. 4689-4693, 1987.

Walker et al., "1-(4-Aminobenzyl)-and 1-(4-Aminophenyl)isoquinolime derivatives: synthesis and evaluation as potential irreversible cyclic nucleotide phosphodiesterase inhibitors", J. Med. Chem., 26, pp. 174-181, 1983.

Jones, John, "The chemical activation and coupling of amino acid derivatives," Amino Acid and Peptide-Synthesis, pp. 25-41, Oxford University Press, 1994.

* cited by examiner

RUBBER COMPOSITION FOR A TIRE COMPRISING A MULTIFUNCTIONAL POLYORGANOSILOXANE AS COUPLING AGENT

CROSS-REFERENCE TO RELATED APPLICATIONS

This application is a continuation of U.S. application Ser. No. 10/320,236, filed on Dec. 16, 2002, now U.S. Pat. No. 6,878,768, which is a continuation of International Application Number PCT/EP01/06671, published in French on Jun. 13, 2001, as International Publication Number WO 01/96442 A1 and filed Dec. 20, 2001, which claims priority to French Patent Application Number 00/07879, filed on Jun. 16, 2000.

FIELD OF THE INVENTION

The present invention relates to diene rubber compositions reinforced with a white or inorganic filler, which are intended in particular for the manufacture of tires or semi-finished products for tires, in particular to the treads for these tires.

BACKGROUND OF THE INVENTION

Since fuel economies and the need to protect the environment have become priorities, it has become desirable to produce elastomers with good mechanical properties and as low a hysteresis as possible so that they can be used in the form of rubber compositions usable for the manufacture of various semi-finished products involved in the constitution of tires, such as, for example, underlayers, calendering or sidewall rubbers, or treads, and to obtain tires with improved properties, having in particular reduced rolling resistance.

To achieve such an objective, numerous solutions have been proposed, first of all ones essentially concentrating on the use of elastomers modified by means of agents such as coupling, starring or functionalizing agents, with carbon black as the reinforcing filler, with the aim of obtaining a good interaction between the modified elastomer and the carbon black. For it is generally known that in order to obtain the optimum reinforcement properties imparted by a filler, the latter should be present in the elastomeric matrix in a final form which is both as finely divided as possible and distributed as homogeneously as possible. Now, such conditions may only be obtained insofar as the filler has a very good ability firstly to be incorporated into the matrix during mixing with the elastomer and to disagglomerate, and secondly to be dispersed homogeneously in the elastomer.

It is fully known that carbon black has such abilities, which is generally not true of inorganic fillers. For reasons of mutual attraction, the inorganic filler particles have a tendency to agglomerate together within the elastomeric matrix. These interactions have the harmful consequence of limiting the dispersion of the filler and hence the reinforcing properties to a substantially lower level than that which it would be theoretically possible to achieve if all the (inorganic filler/elastomer) bonds that could be created during the mixing operation were in fact obtained. These interactions also tend to increase the consistency of the rubber compositions in the uncured state and therefore to make them more difficult to work ("processability") than in the presence of carbon black.

However, interest in rubber compositions reinforced with an inorganic filler was greatly revived with the publication of European Patent Application EP 0 501 227, which discloses a sulfur-vulcanizable diene rubber composition, reinforced with a special precipitated silica ($SiO_2$) of the highly dispersible type, which makes it possible to manufacture a tire or tread with substantially improved rolling resistance, without adversely affecting the other properties, in particular those of grip, endurance and wear resistance.

European Patent Application No. EP 0 810 258 discloses a diene rubber composition reinforced by another special inorganic filler, in this case a specific alumina ($Al_2O_3$) of high dispersibility, which also makes it possible to obtain tires or treads having such an excellent compromise of contradictory properties.

Although the use of these specific, highly dispersible silicas or aluminas as reinforcing fillers, whether or not as the major component, has reduced the difficulties of processing the rubber compositions that contain them, they are still more difficult to process than for rubber compositions filled conventionally with carbon black.

In particular, it is necessary to use a coupling agent, also known as a bonding agent, the function of which is to provide the connection between the surface of the inorganic filler particles and the elastomer, while facilitating the dispersion of this inorganic filler within the elastomeric matrix.

The term (inorganic filler/elastomer) "coupling agent" is understood in known manner to mean an agent capable of establishing a sufficient chemical and/or physical connection between the inorganic filler and the diene elastomer. Such a coupling agent, which is at least bifunctional, has, for example, the simplified general formula "Y-G-X," in which:

Y represents a functional group ("Y" function) which is capable of bonding physically and/or chemically with the inorganic filler, such a bond being able to be established, for example, between a silicon atom of the coupling agent and the surface hydroxyl (OH) groups of the inorganic filler (for example, surface silanols in the case of silica);

X represents a functional group ("X" function) which is capable of bonding physically and/or chemically with the diene elastomer, for example by means of a sulfur atom; and G represents a divalent group making it possible to link Y and X.

The coupling agents must particularly not be confused with simple agents for covering the inorganic filler which, in known manner, may comprise the function Y which is active with respect to the inorganic filler but are devoid of the function X which is active with respect to the diene elastomer.

Coupling agents, in particular (silica/diene elastomer) coupling agents, have been described in a large number of documents, and the best known such coupling agents are bifunctional alkoxysilanes. Thus, in French patent application No. FR 2 094 859, it was proposed to use a mercaptosilane coupling agent for the manufacture of tire treads. It was quickly shown, and is today well known, that the mercaptosilanes, and in particular γ-mercaptopropyltrimethoxysilane or γ-mercaptopropyltriethoxysilane, are capable of giving excellent silica/elastomer coupling properties, but that these coupling agents cannot be used industrially because of the high reactivity of the —SH functions, which very rapidly results in "scorching" (which is premature vulcanization during the preparation of the rubber composition in an internal mixer), in very high Mooney plasticity values and, finally, in rubber compositions which are virtually impossible to work and process industrially. To illustrate this impossibility of using such coupling agents and the rubber compositions that contain them industrially, French patent application no. FR 2 206 330 and U.S. Pat. No. 4,002,594 may be cited.

To overcome this drawback, it has been proposed to replace these mercaptosilane coupling agents by polysulfurized alkoxysilanes, in particular bis-($C_1$–$C_4$)alkoxysilylpropyl polysulfides such as those described in numerous patents or patent applications. (See, for example, French patent application no. FR 2 206 330 and U.S. Pat. Nos. 3,842,111; 3,873,489, 3,978,103, and 3,997,581.)

These polysulfurized alkoxysilanes are now generally considered to be the products which, for vulcanized rubber compositions filled with silica, give the best compromise in terms of resistance to scorching, processability and reinforcing power. Among these polysulfides, mention must be made of bis-3-triethoxysilylpropyl tetrasulfide (abbreviated to TESPT), which is the (inorganic filler/diene elastomer) coupling agent known to be the most effective, and hence the most used today, in rubber compositions for tires, in particular those intended to form treads for these tires. TESPT is sold, for example, by Degussa under the name "Si69". However, this product has the known disadvantage that it is very costly and needs to be used most frequently in a relatively large quantity. (See, for example, U.S. Pat. Nos. 5,652,310; 5,684,171; and 5,684,172.)

SUMMARY OF THE INVENTION

Now, unexpectedly, it has been discovered that specific coupling agents may have a superior coupling performance to that of polysulfurized alkoxysilanes, in particular that of TESPT, in the rubber compositions for tires based on isoprene elastomer (natural rubber, synthetic polyisoprenes or isoprene copolymers). These specific coupling agents, which do not have the aforementioned problems of premature scorching that are associated with mercaptosilanes, are special polyfunctional polyorganosiloxanes, which bear an activated ethylene double bond.

Consequently, the present invention relates to an elastomeric composition, which is sulfur-cross-linkable and useful for the manufacture of tires, comprising an isoprene elastomer, an inorganic filler as reinforcing filler, and a (inorganic filler/isoprene elastomer) coupling agent. The (inorganic filler/isoprene elastomer) coupling agent is a multifunctional polyorganosiloxane (abbreviated to "POS") comprising, grafted to its silicon atoms, on one hand at least one hydroxyl or hydrolysable function (radical or function "Y"), and on the other hand at least one group bearing at least one activated ethylene double bond (radical or function "X").

Another subject of the present invention is the use of a rubber composition according to the invention for the manufacture of tires or for the manufacture of semi-finished products intended for such tires, these semi-finished products being selected in particular from the group consisting of treads, underlayers intended, for example, to be positioned beneath these treads, crown plies, sidewalls, carcass plies, beads, protectors, inner tubes and airtight internal rubbers for tubeless tires.

The present invention also relates to these tires and these semi-finished rubber products themselves, when they comprise a rubber composition according to the invention. The present invention relates in particular to treads for tires, where these treads may be used in the manufacture of new tires or for recapping worn tires. Because of the compositions of the invention, these treads have both low rolling resistance and high wear resistance.

The invention also relates to a process for the preparation of a composition according to the invention. This process comprises incorporating into at least one isoprene elastomer at least one inorganic filler as reinforcing filler and a multifunctional POS as described above, and kneading the entire mixture thermomechanically, in one or more stages, until a maximum temperature of between 110° C. and 190° C. is reached.

Another subject of the present invention is the use, as (inorganic filler/isoprene elastomer) coupling agent, in a rubber composition comprising an isoprene elastomer and reinforced with an inorganic filler, of such a POS which bears on one hand a hydroxyl or hydrolysable function, and on the other hand an activated ethylene double bond.

An additional subject of the present invention is a process for coupling an inorganic filler and an isoprene elastomer, in a sulfur-vulcanizable elastomeric composition usable for the manufacture of tires, this process being characterized in that there are incorporated in at least one isoprene elastomer at least one inorganic filler as reinforcing filler and a multifunctional POS as described above, and in that the entire mixture is kneaded thermomechanically, in one or more stages, until a maximum temperature of between 110° C. and 190° C. is reached.

BRIEF DESCRIPTION OF THE DRAWINGS

The invention and its advantages will be readily understood in the light of the description and example embodiments which follow, and of the accompanying drawings, wherein.

DETAILED DESCRIPTION OF THE INVENTION

Figure 1:
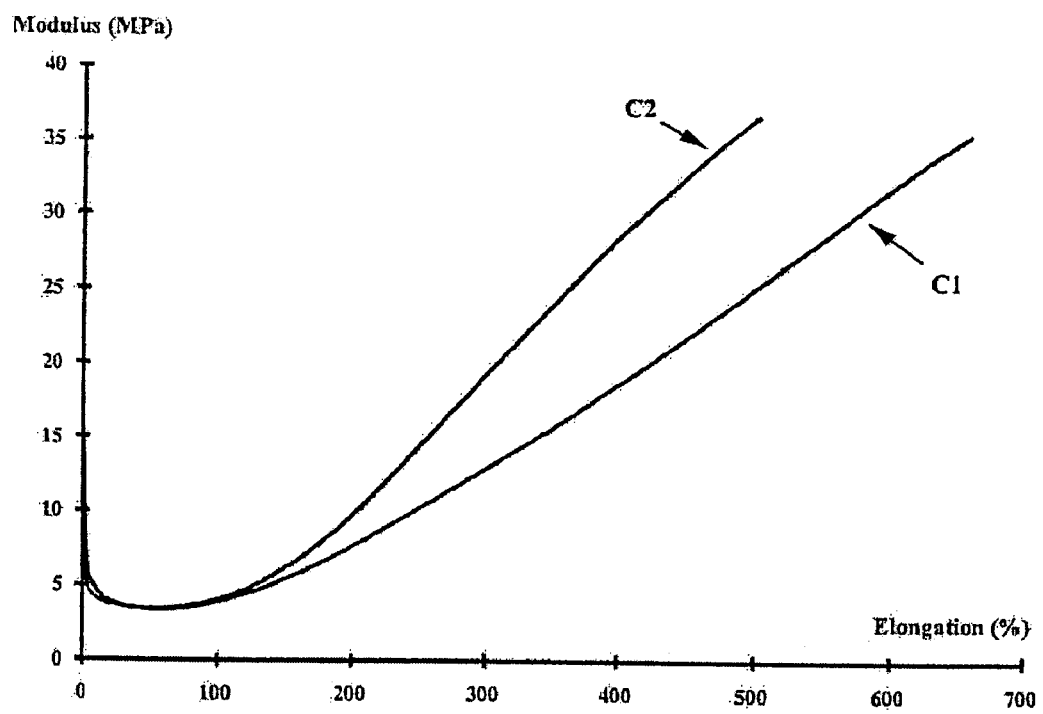
FIG. 1 shows curves of the variation of modulus (in MPa) as a function of elongation (in %) for rubber compositions C1 and C2.

The rubber compositions are characterized before and after curing, as indicated below.

Measurements and Tests Used:

Mooney Plasticity:

An oscillating consistometer such as described in French Standard NF T43-005 (1991) is used. The Mooney plasticity is measured in accordance with the following principle: the raw composition (i.e. before curing) is molded in a cylindrical enclosure heated to 100° C. After one minute's preheating, the rotor turns within the test piece at 2 rpm, and the torque used for maintaining this movement is measured after four minutes' rotation. The Mooney plasticity (MS 1+4) is expressed in "Mooney units" (MU, with 1 MU=0.83 Newton.meter).

Scorching Time:

The measurements are effected at 130° C., in accordance with French Standard NFT 43-005 (1991). The evolution of the consistometric index as a function of time makes it possible to determine the scorching time for the rubber compositions, assessed in accordance with the above standard by the parameter T5 (case of a large rotor), expressed in minutes, and defined as being the time necessary to obtain an increase in the consistometric index (expressed in MU) of 5 units above the minimum value measured for this index.

Tensile Tests:

These tests make it possible to determine the elasticity stresses and the properties at break. Unless indicated otherwise, they are effected in accordance with French Standard NFT 46-002 of September 1988. The nominal secant moduli (or apparent stresses, in MPa) at 10% elongation (M10), 100% elongation (M100) and 300% elongation (M300) are measured in a second elongation (i.e. after an accommodation cycle). The breaking stresses (in MPa) and the elongations at break (in %) are also measured. All these tensile measurements are effected under normal conditions of temperature and humidity in accordance with French Standard NF T40-101 (December 1979).

Processing the tensile data recorded also makes it possible to trace the curve of the modulus as a function of the elongation (see attached figures), the modulus used here being the true secant modulus measured in a first elongation, calculated reduced to the real cross-section of the test piece, and not to the initial section as previously for the nominal moduli.

Dynamic Properties:

The dynamic properties $\Delta G^*$ and $\tan(\delta)$max are measured on a viscoanalyzer (Metravib VA4000), in accordance with ASTM Standard D 5992-96. The response of a sample of vulcanized composition (cylindrical test piece of a thickness of 4 mm and a section of 400 mm$^2$), subjected to an alternating single sinusoidal shearing stress, at a frequency of 10 Hz, under normal conditions of temperature (23° C.) in accordance with Standard ASTM D 1349-99, was recorded. Scanning was effected at an amplitude of deformation of 0.1 to 50% (outward cycle), then of 50% to 1% (return cycle). The results used are the complex dynamic shear modulus ($G^*$) and the loss factor $\tan \delta$. For the return cycle, the maximum value of $\tan \delta$ which is observed is indicated ($\tan(\delta)_{max}$), and the deviation in the complex modulus ($\Delta G^*$) between the values at 0.15 and 50% deformation (Payne effect).

The rubber compositions according to the invention are based on at least each of the following constituents: (i) a (at least one) isoprene elastomer (component A defined hereafter), (ii) a (at least one) inorganic filler as reinforcing filler (component B defined hereafter), and (iii) a (at least one) specific POS (component C defined hereafter) as (inorganic filler/isoprene elastomer) coupling agent.

The expression composition "based on" is to be understood to mean a composition comprising the mix and/or the product of reaction in situ of the various constituents used, some of these base constituents being liable to, or intended to, react together, at least in part, during the different phases of manufacture of the composition, in particular during the vulcanization thereof.

Isoprene Elastomer (Component A):

"Diene" elastomer (or rubber) is understood to mean, in known manner, an elastomer resulting at least in part (i.e. a homopolymer or a copolymer) from diene monomers, that is to say, monomers bearing two carbon-carbon double bonds, whether conjugated or not. "Essentially unsaturated" diene elastomer is understood here to mean a diene elastomer resulting at least in part from conjugated diene monomers, having a content of members or units of diene origin (conjugated dienes) which is greater than 15% (mol %). Within the category of "essentially unsaturated" diene elastomers, "highly unsaturated" diene elastomer is understood to mean in particular a diene elastomer having a content of units of diene origin (conjugated dienes) which is greater than 50%.

These general definitions being given, in the present application "isoprene elastomer" is understood to mean, in known manner, an isoprene homopolymer or copolymer, in other words a diene elastomer selected from the group consisting of natural rubber (NR), synthetic polyisoprenes (IR), the various isoprene copolymers and mixtures of these elastomers. Of the isoprene copolymers, mention will be made in particular of isobutene-isoprene copolymers (butyl rubber—IIR), isoprene-styrene copolymers (SIR), isoprene-butadiene copolymers (BIR) or isoprene-butadiene-styrene copolymers (SBIR).

This isoprene elastomer is preferably natural rubber or a synthetic polyisoprene of the cis-1,4 type. Of these synthetic polyisoprenes, preferably polyisoprenes having a content (mole %) of cis-1,4 bonds greater than 90%, more preferably still greater than 98%, are used.

In a blend with the isoprene elastomer above, the compositions of the invention may contain diene elastomers other than isoprene ones, in a minority proportion (i.e. for less than 50% by weight) or a majority proportion (i.e. for more than 50% by weight), depending on the intended applications. They could also comprise non-diene elastomers, or even polymers other than elastomers, for example thermoplastic polymers.

As such diene elastomers other than isoprene elastomers, mention will be made in particular of any highly unsaturated diene elastomer selected in particular from the group consisting of polybutadienes (BR), butadiene copolymers, in particular styrene-butadiene copolymers (SBR), and mixtures of these different elastomers.

If such diene elastomers other than isoprene ones are used, the person skilled in the art of tires will readily understand that coupling agents other than the multifunctional POS described here (POS having an activated double bond), in particular polysulfurized alkoxysilanes, may then be advantageously used to couple these complementary diene elastomers.

The improvement of the coupling provided by the invention is particularly notable on rubber compositions having an elastomeric base which is formed primarily (i.e., more than 50% by weight) of polyisoprene, i.e. natural rubber or synthetic polyisoprene.

The composition according to the invention is particularly intended for a tread for a tire, be it a new or a used tire (recapping), in particular for a tire intended for industrial or utility vehicles such as "heavy vehicles" or "trucks"—i.e. subway trains, buses, road transport machinery (lorries, tractors, trailers), or off-road vehicles.

In such a case, the best known embodiment of the invention consists of using solely polyisoprene as isoprene elastomer, more preferably natural rubber. It is with such conditions that the best performance in terms of rolling resistance and wear resistance have been observed.

However, the person skilled in the art of tires will understand that various blends between isoprene elastomer, in particular natural rubber, and other diene elastomers, in particular SBR and/or BR, are also possible in rubber compositions according to the invention usable for example for various parts of the tire other than its tread, for example for sidewalls or for protectors for tires for passenger vehicles, vans or trucks, whether these blends have a minority or a majority proportion of the isoprene elastomer.

Reinforcing Filler (Component B):

The white or inorganic filler used as reinforcing filler may constitute all or only part of the total reinforcing filler, in this latter case associated, for example, with carbon black.

Preferably, in the rubber compositions according to the invention, the reinforcing inorganic filler constitutes the majority, i.e. more than 50% by weight, of the total reinforcing filler, more preferably more than 80% by weight of this total reinforcing filler.

In the present application, "reinforcing inorganic filler", in known manner, is understood to mean an inorganic or mineral filler, whatever its color and its origin (natural or synthetic), also referred to as "white" filler or sometimes "clear" filler in contrast to carbon black, this inorganic filler being capable, on its own, without any other means than an intermediate coupling agent, of reinforcing a rubber composition intended for the manufacture of tires, in other words which is capable of replacing a conventional tire-grade carbon black filler in its reinforcement function.

The reinforcing inorganic filler is in particular a mineral filler of the type silica ($SiO_2$) or alumina ($Al_2O_3$), or a mixture of these two fillers.

The silica used may be any reinforcing silica known to the person skilled in the art, in particular any precipitated or pyrogenic silica having a BET surface area and a specific CTAB surface area both of which are less than 450 $m^2/g$, preferably from 30 to 400 $m^2/g$. Highly dispersible precipitated silicas (referred to as "HD") are preferred, in particular when the invention is used for the manufacture of tires having a low rolling resistance; "highly dispersible silica" is understood in known manner to mean any silica having a substantial ability to disagglomerate and to disperse in an elastomeric matrix, which can be observed in known manner by electron or optical microscopy on thin sections.

As non-limiting examples of such preferred highly dispersible silicas, mention may be made of the silica Perkasil KS 430 from Akzo, the silica BV3380 from Degussa, the silicas Zeosil 1165 MP and 1115 MP from Rhodia, the silica Hi-Sil 2000 from PPG, the silicas Zeopol 8741 or 8745 from Huber, and treated precipitated silicas such as, for example, the aluminum-"doped" silicas described in application EP 735 088.

The reinforcing alumina preferably used is a highly dispersible alumina having a BET surface area from 30 to 400 m2/g, more preferably between 60 and 250 $m^2/g$, and an average particle size at most equal to 500 nm, more preferably at most equal to 200 nm, as described in the aforementioned application EP 810 258. Non-limiting examples of such reinforcing aluminas are in particular the aluminas "Baikalox" "A125", "$CR^{125}$", "D65CR" from Baikowski.

The physical state in which the reinforcing inorganic filler is present is immaterial, whether it be in the form of a powder, microbeads, granules or alternatively balls.

The phrase "reinforcing inorganic filler" is also understood to mean mixtures of different reinforcing inorganic fillers, in particular of highly dispersible silicas and/or aluminas such as described above.

When the rubber compositions of the invention are used as treads for tires, the reinforcing inorganic filler used, in particular if it is silica, preferably has a BET surface area of between 60 and 250 $m^2/g$, more preferably between 80 and 200 $m^2/g$.

The reinforcing inorganic filler may also be used in a blend (mixture) with carbon black. Suitable carbon blacks are all the carbon blacks, in particular the blacks of the type HAF, ISAF and SAF, which are conventionally used in tires, and particularly in treads for tires. As non-limiting examples of such blacks, mention may be made of the blacks N115, N134, N234, N339, N347 and N375.

The amount of carbon black present in the total reinforcing filler may vary within wide limits, this amount of carbon black preferably being less than the amount of reinforcing inorganic filler present in the rubber composition.

In the compositions according to the invention, in association with the reinforcing inorganic filler, it is preferred to use a carbon black in a small proportion, in a preferred amount of between 2 and 20 phr, more preferably within a range from 5 to 15 phr (parts by weight per hundred parts of elastomer). Within the ranges indicated, there is a benefit to be had from the coloring properties (black pigmentation agent) and anti-UV properties of the carbon blacks, without furthermore adversely affecting the typical performance provided by the reinforcing inorganic filler, namely low hysteresis (reduced rolling resistance) and high adhesion both on wet ground and on snow-covered or icy ground.

Preferably, the amount of total reinforcing filler (reinforcing inorganic filler plus carbon black if applicable) is between 10 and 200 phr, more preferably between 20 and 150 phr, the optimum differing according to the intended applications, because the level of reinforcement expected of a bicycle tire, for example, is in known manner distinctly lower than that required for a tire liable to travel at a sustained high speed, for example a motorcycle tire, a passenger-vehicle tire or a tire for a utility vehicle such as a truck.

For treads for tires which are liable to travel at high speed, the quantity of reinforcing inorganic filler, in particular if it is silica, is preferably between 30 and 120 phr, more preferably between 40 and 100 phr.

It will be understood that when the sole diene elastomer present in the composition according to the invention is an isoprene elastomer, the abbreviation "phr" may then be replaced by "phi" (parts by weight per hundred parts of isoprene elastomer).

In the present specification, the BET specific surface area is determined in known manner, in accordance with the method of Brunauer, Emmett and Teller described in "The Journal of the American Chemical Society", vol. 60, page 309, February 1938, and corresponding to French Standard NF T 45-007 (November 1987); the CTAB specific surface area is the external surface area determined in accordance with the same Standard NF T 45-007.

Finally, the person skilled in the art will understand that, as filler equivalent to the reinforcing inorganic filler described in the present section, there could be used a reinforcing filler of organic type, in particular a carbon black for tires, covered at least in part with an inorganic layer which for its part requires the use of a coupling agent to provide the bond to the elastomer.

Coupling Agent (Component C):

In known manner, as already explained above, an (inorganic filler/diene elastomer) coupling agent is a compound bearing at least two functions, here referred to as "Y" and "X", which enable it to be grafted, on one hand, to the reinforcing inorganic filler by means of the function Y, and on the other hand to the diene elastomer by means of the function X.

The coupling agent (component C) used in the rubber compositions according to the invention is an at least bifunctional POS comprising per molecule, grafted on to its silicon atoms, on one hand at least one hydroxyl or hydrolysable function (hereafter radical or function "Y") which enables it to be grafted to the reinforcing inorganic filler, on the other hand, and this is the essential characteristic of this POS for the intended application, at least one group bearing at least one activated ethylene double bond (hereafter radical or function "X") which enables it to be grafted on to the isoprene elastomer.

These functions or radicals X and Y will be described in detail below before developing the preferred possible structures for component C.

The radical X is the group bearing the activated carbon-carbon double bond which is intended to be grafted onto the isoprene elastomer during the vulcanization stage, by formation of a covalent bond with the latter.

It will be recalled that, in known manner, an "activated" bond is a bond which has been rendered more likely to react (in this case, with the isoprene elastomer).

The ethylene double bond (>C=C<) of the radical X is preferably activated by the presence of an adjacent electron-attracting group, that is to say one fixed to one of the two carbon atoms of the ethylene double bond. It will be recalled that, by definition, an "electron-attracting" group is a radical or functional group which is able to attract the electrons to itself more than a hydrogen atom would if it occupied the same position in the molecule in question.

This electron-attracting or "activating" group is preferably selected from among the radicals bearing at least one of the bonds C=O, C=C, C C, OH, OR (R alkyl) or OAr (Ar aryl), or at least one sulfur and/or nitrogen atom, or at least one halogen.

Mention will be made more preferably of an activating group selected from among the radicals acyl (—COR), carbonyl (>C=O), carboxyl (—COOH), carboxy-ester (—COOR), or carbamyl (—CO—NH2; —CO—NH—R; —CO—N—R$_2$), alkoxy (—OR), aryloxy (—OAr), hydroxy (—OH), alkenyl (—CH=CHR), alkynyl (—C=CR), naphthyl (C$_{10}$H$_7$—), phenyl (C$_6$H$_5$—), radicals bearing at least one sulfur (S) and/or nitrogen (N) atom, or at least one halogen.

By way of specific examples of such an activating group, mention may be made in particular, apart from those already mentioned, of the radicals acetyl, propionyl, benzoyl, toluyl, formyl, methoxycarbonyl, ethoxycarbonyl, methylcarbamyl, ethylcarbamyl, benzylcarbamyl, phenylcarbamyl, dimethylcarbamyl, diethylcarbamyl, dibenzylcarbamyl, diphenylcarbamyl, methoxy, ethoxy, phenoxy, benzyloxy, vinyl, isopropenyl, isobutenyl, ethynyl, xylyl, tolyl, methylthio, ethylthio, benzylthio, phenylthio, thiocarbonyl, thiuram, sulphinyl, sulphonyl, thiocyanato, amino, toluidino, xylidino, cyano, cyanato, isocyanato, isothiocyanato, hydroxyamino, acetamido, benzamido, nitroso, nitro, azo, hydrazo, hydrazino, azido, ureido, and radicals bearing at least one chlorine or bromine atom.

More preferably still, the electron-attracting group is selected from among carbonyls, carboxyls, carboxy-esters and radicals bearing sulfur and/or nitrogen with a carbonyl root. Very particularly, a POS bearing an ethylene double bond which is activated by an adjacent radical bearing at least one (C=O) bond is used.

The function Y is a hydroxyl function or a hydrolysable function fixed to a silicon atom of the POS, in particular an alkoxyl function (OR$^1$) in which R$^1$ is a monovalent hydrocarbon group, whether straight-chain or branched, comprising preferably 1 to 15 carbon atoms.

In other words, functions Y selected from the so-called "hydroxysilyl" (≡Si—OH) or "alkoxysilyl" functions (≡Si—OR$^1$) are particularly suitable; this radical R$^1$ comprising from 1 to 15 carbon atoms is more preferably selected from among alkyls, alkoxyalkyls, cycloalkyls and aryls, in particular from among C$_1$–C$_6$ alkyls, C$_2$–C$_6$ alkoxyalkyls, C$_5$–C$_8$ cycloalkyls and phenyl.

Multifunctional POS usable in the compositions of the invention are in particular POS formed of siloxyl units, which may be identical or different, of formula (I) below:

$$R^2{}_a Y_b X_c Si\ O_{(4-a-b-c)/2} \quad (I)$$

in which:

a, b and c are each integers or fractional numbers from 0 to 3;

the radicals R$^2$, which may be identical or different if they are several in number, represent a monovalent hydrocarbon radical;

the radicals Y, which may be identical or different if they are several in number, represent a hydroxyl or hydrolysable group such as defined above, which is capable of bonding to the reinforcing inorganic filler;

the radicals X, which may be identical or different if they are several in number, represent the group bearing the activated ethylene double bond such as defined above, which is capable of bonding with the isoprene elastomer, with the qualification that:

$0<(a+b+c)\leq 3$;

at least one radical X and at least one radical Y are present in the polysiloxane molecule.

The simplified notation used in formula (I) above is well-known to the person skilled in the art in the field of polyorganosiloxanes; it covers the various particular formulae possible for the siloxyl units, whatever in particular their amount of functionalization, their position on the polysiloxane chain (along the chain or at the chain end(s)) or the nature of the POS (for example straight-chain, branched or cyclic).

This POS of formula (I) is therefore a copolymer, whether statistical, sequential or a block copolymer, branched, straight-chain or cyclic, comprising at least the two functions Y and X defined above on the polysiloxane chain, be it either along the chain or at the chain end(s).

In formula (I) above, it will be understood that the radicals R$^2$ may be identical or different within one and the same siloxyl unit (when several of them are present in this same unit), or identical or different from one siloxyl unit to the other. The same is true for the radicals Y and X.

The radicals R$^2$ are preferably selected from among C$_1$–C$_6$ alkyls, whether straight-chain or branched, and C$_5$–C$_8$ cycloalkyls, in particular from among methyl, ethyl, n-propyl, n-butyl, n-pentyl, cyclohexyl and/or among aryls, in particular phenyl. More preferably, the radicals R$^2$ are methyl radicals.

The radicals Y are preferably selected from among the group consisting of hydroxyl (OH) and C$_1$–C$_6$ alkoxyls, in particular methoxyl, ethoxyl, propoxyl or isopropoxyl, or a mixture of these hydroxyls or alkoxyls. More preferably, the radicals Y are selected from among hydroxyl, methoxyl, ethoxyl and mixtures of these radicals.

By way of preferred examples of radicals X, mention will be made of those of formulae (X/a), (X/b) or (X/c) below:

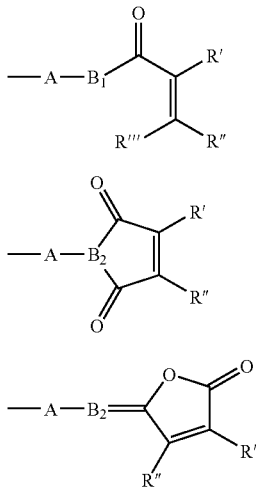

(X/a)

(X/b)

(X/c)

in which:

B$_1$ is O, NH, N-alkyl, N-aryl in particular n-phenyl, S, CH$_2$, CH-alkyl or CH-aryl in particular CH-phenyl;

B$_2$ is N, CH, C-alkyl or C-aryl in particular C-phenyl;

the radicals R', R" and R'", which may be identical or different, represent hydrogen, a C$_1$–C$_6$ alkyl, whether substituted or non-substituted, a cyano radical, a halogen- or a C$_6$–C$_{10}$ aryl, whether substituted or non-substituted, in particular a phenyl, R" and/or R'" (i.e. any one of these radicals or both) may furthermore represent a monovalent COOH group or a derived group of the ester or amide type;

the divalent group A is intended to produce the bond with the polysiloxane chain.

It will be noted that the role of the "swivel points" B$_1$ and B$_2$ is to provide the bond between the group A and the activated double bond. The point common to the above three structures is the presence of an ethylene double bond (>C=C<) activated by at least one adjacent carbonyl group (>C=O). The group A, whether substituted or non-substituted, is preferably a hydrocarbon radical, saturated or non-saturated, comprising from 1 to 18 carbon atoms, said group A possibly being interrupted by at least one heteroatom (such as, for example O or N) or at least one divalent group comprising at least one heteroatom (such as, for example O or N); in particular C$_1$–C$_{18}$ alkylene groups or C$_6$–C$_{12}$ arylene groups, more particularly C$_1$–C$_{10}$ alkylenes, notably C$_2$–C$_4$ alkylenes, in particular propylene, are suitable.

By way of preferred examples of such structures, mention will be made in particular of those of formulae (II) below:

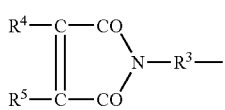

(II/1)

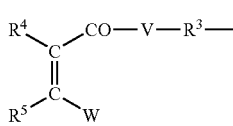

(II/2)

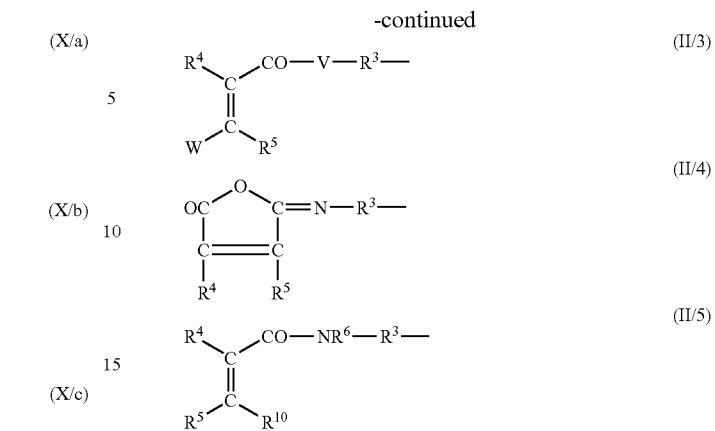

in which formulae:

the symbol V represents a divalent radical —O— or —NR$^6$—;

the symbol W represents a monovalent group COOR$^7$ or a monovalent group CONR$^8$R$^9$;

R$^3$ is a divalent alkylene radical, straight-chain or branched, comprising from 1 to 15 carbon atoms, the free valency of which is borne by a carbon atom and is linked to a silicon atom, said radical R$^3$ possibly being interrupted within the alkylene chain by at least one heteroatom (such as O or N) or at least one divalent group comprising at least one heteroatom (such as O or N);

the symbols R$^4$ and R$^5$, which may be identical or different, each represent a hydrogen atom, a halogen atom, a cyano radical or an alkyl radical, straight-chain or branched, having from 1 to 6 carbon atoms, R$^5$ possibly representing furthermore a monovalent COOR$^7$ group;

the symbols R$^6$, R$^7$, R$^8$, R$^9$ and R$^{10}$, which may be identical or different, each represent a hydrogen atom, an alkyl radical, straight-chain or branched, having from 1 to 6 carbon atoms, or a phenyl radical, the symbols R$^8$ and R$^9$ possibly, furthermore, forming together and with the nitrogen atom to which they are bonded, a single saturated ring having from 3 to 8 carbon atoms in the ring.

When R$^3$ is interrupted within the alkylene chain by at least one heteroatom, the heteroatom is present in the form of a divalent radical preferably selected from among —O—, —CO—, —CO—O—, —COO-cyclohexylene (possibly substituted by an OH radical)-, —O-alkylene (straight-chain or branched, C$_2$–C$_6$, possibly substituted by an OH or COOH radical)-, —O—CO-alkylene (straight-chain or branched, C$_2$–C$_6$, possibly substituted by an OH or COOH radical)-, —CO—NH, —O—CO—NH—, and —NH-alkylene (straight-chain or branched, C$_2$–C$_6$)—CO—NH—; R$^3$ also represents an aromatic radical selected from among -phenylene(ortho, meta or para)-alkylene (straight-chain or branched, C$_2$–C$_6$)-, -phenylene(ortho, meta or para)-O-alkylene (straight-chain or branched, C$_2$–C$_6$)-, -alkylene (straight-chain or branched, C$_2$–C$_6$)-phenylene(ortho, meta or para)-alkylene (straight-chain or branched, C$_1$–C$_6$)-, and -alkylene (straight-chain or branched, C$_2$–C$_6$)-phenylene (ortho, meta or para)-O-alkylene (straight-chain or branched, C$_1$–C$_6$)-.

R$^4$ and R$^5$ are preferably selected from among hydrogen, chlorine, methyl, ethyl, n-propyl, n-butyl, R$^5$ possibly furthermore representing a COOR$^7$ group in which the radical R$^7$ is selected from among hydrogen, methyl, ethyl, n-propyl and n-butyl.

$R^6$, $R^7$, $R^8$, $R^9$ and $R^{10}$ are preferably selected from among hydrogen and the radicals methyl, ethyl, n-propyl, n-butyl, the symbols $R^8$ and $R^9$ possibly, furthermore, forming together and with the nitrogen atom a pyrrolidinyl or piperidyl ring.

One point common to the above five structures is the presence of an ethylene double bond (>C=C<) activated by at least one adjacent carbonyl group (>C=O).

In these formulae (II/1 to II/5), the following characteristics are more preferably satisfied:

$R^3$ represents an alkylene radical selected from among —(CH$_2$)$_2$—; —(CH$_2$)$_3$—; —(CH$_2$)$_4$—; —CH$_2$—CH(CH$_3$)—; —(CH$_2$)$_2$—CH(CH$_3$)—CH$_2$—; —(CH$_2$)$_3$—O—(CH$_2$)$_3$—; —(CH$_2$)$_3$—O—CH$_2$—CH(CH$_3$)—CH$_2$—; —(CH$_2$)$_3$—O—CH$_2$CH(OH)—CH$_2$—; more particularly $R^3$ is selected from among —(CH$_2$)$_2$— or —(CH$_2$)$_3$—;

$R^4$ and $R^5$ are selected from among a hydrogen or chlorine atom, or the radicals methyl, ethyl, n-propyl, n-butyl, more particularly hydrogen or methyl, $R^5$ possibly furthermore representing a COOH$^7$ group in which $R^7$ represents hydrogen or methyl;

$R^6$, $R^7$, $R^8$, $R^9$ and $R^{10}$ are selected from among hydrogen and methyl, $R^8$ and $R^9$ possibly, furthermore, forming together and with the N atom a piperidyl ring.

More preferably still, the POS of the compositions of the invention satisfy at least one of the following characteristics:

c is equal to 0 or 1;

the amount of units $R^{11}$ SiO$_{3/2}$ (units marked "T" in silicone chemistry)—in which $R^{11}$ is selected from among the radicals meeting the definitions of $R^2$, Y and X—this amount being expressed by the number, per molecule, of these units per 100 atoms of silicon, is less than or equal to 30%, preferably less than or equal to 20%;

the amount of functions Y, expressed by the number, per molecule, of functions Y per 100 atoms of silicon, is at least 0.8%, and, preferably, lies within the range from 1 to 100%;

the amount of functions X, expressed by the number, per molecule, of functions X per 100 atoms of silicon, is at least 0.4%, and, preferably, lies within the range from 0.8 to 100%.

Given the values which the symbols a, b and c may adopt, and the statements above relative to the radical $R^{11}$, it will be understood that the multifunctional POS of formula (I) may have in particular either a linear structure or a cyclic structure, or a mixture of these structures, these structures possibly having furthermore a certain molar quantity of branches (units "T").

Taking into account the meanings given above with respect to the radicals X, it should also be understood that a multifunctional POS in accordance with formula (I) may bear in particular:

in addition to maleimide (II/1), isomaleimide (II/4) and acrylamide (II/5) function(s):

maleamic acid and/or fumaramic acid function(s), when, in formulae (II/2) and/or (II/3), the symbol V=—NR$^6$— and the symbol W=COOR$^7$ in which $R^7$=H;

maleic ester and/or fumaric ester function(s), when, in formulae (II/2) and/or (II/3), the symbol V=—O— and the symbol W=COOR$^7$ in which $R^7$ is different from H;

maleamic ester and/or fumaramic ester function(s), when, in formulae (II/2) and/or (II/3), either the symbol V=—NR$^6$ and the symbol W=COOR$^7$ in which $R^7$ is different from H, or the symbol V=—O— and the symbol W=CONR$^8$R$^9$;

maleic amide and/or fumaric amide function(s), when, in formulae (II/2) and/or (II/3), the symbol V=—NR$^6$— and the symbol W=CONR$^8$R$^9$.

By way of preferred examples of POS of formula (II) which satisfy the definitions above, mention will be made in particular of the essentially linear POS corresponding to the following average formula (III):

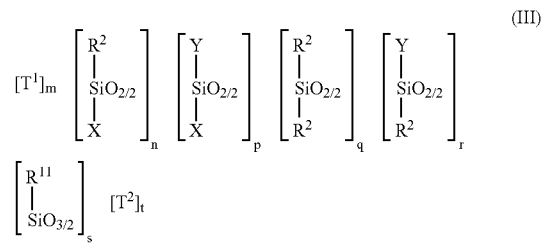

in which:

the symbols $R^1$, $R^2$, X and Y are as defined above;

the symbols $R^{11}$ are selected from among $R^2$, X and Y;

the symbols $T^1$ are selected from among the units HO$_{1/2}$ and $R^1$O$_{1/2}$;

the symbols $T^2$, which may be identical to or different from the symbols $T^1$, are selected from among the units HO$_{1/2}$, $R^1$O$_{1/2}$ and the unit (R$^2$)$_3$SiO$_{1/2}$;

the symbols m, n, p, q, r, s and t each represent integers or fractional numbers which meet the following cumulative conditions:

m and t are other than zero and their total is equal to 2+s;

n, p, q and r lie within the range from 0 to 100;

s lies within the range from 0 to 75;

when n=0, p is other than zero and when p=0, n is other than zero;

the total (n+p+q+r+s+t)— giving the total number of silicon atoms— lies within the range from 2 to 250;

the ratio 100 s/(n+p+q+r+s+t)— giving the amount of units "T"— is at most equal to 30, preferably at most equal to 20;

the ratio 100 (m+p+r+s[when $R^{11}$=Y]+t)/(n+p+q+r+s+t)— giving the number of functions Y (provided by the units represented by the symbols $T^1$, $T^2$ and Y)— is equal to or greater than 1, preferably within a range from 4 to 100;

the ratio 100 (n+p+s[when $R^{11}$=X])/(n+p+q+r+s+t)— giving the number of functions X— is equal to or greater than 1, preferably within a range from 2 to 100.

As components C which are more preferably used, mention will be made of those comprising the oligomets and the polymers referred to as POS/1 which are essentially linear and which satisfy the formula (II) above and in which (reference will then be made, in abbreviated form, in this case, to polymers POS/I of imide type):

the functions X, which may be identical or different, are selected from among the radicals of formulae (II/1), (II/2), (II/3) and their mixtures, with the conditions that:

at least one of the functions X satisfies the formula (II/1); $R^5$ is other than a COOH$^7$ group;

in formulae (II/2) and (II/3), the symbol V=—NR$^6$ in which $R^6$=H, $R^5$ is other than a COOR$^7$ group and the symbol W=COOR$^7$ in which $R^7$=H;

at least one of the functions X satisfies the formula (II/1);

when, if applicable, there is a mixture of function(s) X of formula (II/1) with functions X of formulae (II/2)

and/or (II/3), the molar fraction of functions X of formulae (II/2) and/or (II/3) in all the functions X is on average equal to or less than 12 mole % and preferably equal to or less than 5 mole %;

the symbols m, n, p, q, r, s and t satisfy the following cumulative conditions:

m+t=2+s;

n lies within the range from 0 to 50;

p lies within the range from 0 to 20;

when n=0, p is at least equal to 1 and when p=0, n is at least equal to 1;

q lies within the range from 0 to 48;

r lies within the range from 0 to 10;

s lies within the range from 0 to 1;

the total (n+p+q+r+s+t)— giving the total number of silicon atoms— lies within the range from 2 to 50;

the ratio 100 s/(n+p+q+r+s+t)— giving the amount of units "T"— is less than or equal to 10;

the ratio 100 (m+p+r+s[when $R^{11}$=Y]+t)/(n+p+q+r+s+t)— giving the number of functions Y (provided by the units represented by the symbols $T^1$, $T^2$ and Y)— lies within a range from 4 to 100, preferably from 10 to 100;

the ratio 100 (n+p+s[when $R^{11}$=X])/(n+p+q+r+s+t)— giving the number of functions X—lies within a range from 10 to 100, preferably from 20 to 100.

As other components C which are more preferably used, mention will also be made of those comprising the oligomers and the polymers referred to as POS/2 which are essentially linear and which satisfy the formula (III) above and in which (reference will then be made, in abbreviated form, in this case, to polymers POS/2 of the acid or ester type):

the symbols $T^2$, which maybe identical to or different from the symbols T1, are selected from among the unit $HO_{1/2}$ and the unit $R^1O_{1/2}$;

the functions X, which may be identical or different, are selected from among the radicals of formulae (II/2), (II/3) and their mixtures, in which on one hand the symbol V=—$NR^6$—, $R^5$ is other than a $COOH^7$ group and either $R^7$ is H(POS/2 of acid type) or $R^7$ is different from H(POS/2 of ester type);

the symbols m, n, p, q, r, s and t meet the cumulative conditions listed above for the POS/1 of imide type.

Cyclic POS are also included in the scope of the invention if they have the following average formula (III'):

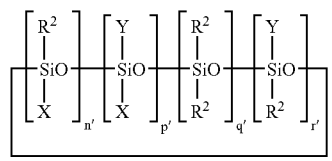

in which:

the symbols n', p', q' and r' each represent integers or fractional numbers which meet the following cumulative conditions:

n', p' and q' lie within the range from 0 to 9;

when n'=0, p' is at least equal to 1;

when p'=0, n' and r' are each at least equal to 1;

r' lies within the range from 0 to 2;

the total (n'+p'+q'+r') lies within the range from 3 to 10;

the ratio 100 (p'+r')/(n'+p'+q'+r')—giving the number of functions Y—lies within a range from 4 to 100;

the ratio 100 (n'+p')/(n'+p'+q'+r')— giving the number of functions X— lies within a range from 10 to 100, these cyclic multifunctional POS being able to be used in a mixture with the essentially linear POS of formula (III) above.

The multifunctionalised POS bearing the functions X of formula (II), those of formula (III) or (III') above may be prepared using a synthesis method using in particular:

a hydrolysis and condensation reaction of a dihalosilane or a dialkoxysilane which bear a function X, possibly in the presence of a dihalosilane or a dialkoxysilane;

a condensation reaction between an organosilane bearing a function X and at least two functions Y, and a α,ω-dihydroxylated linear POS;

a reaction of redistribution and equilibration between an organosilane bearing a function X and at least two functions Y and/or halo, and an organocyclosiloxane which may possibly bear one or more functions Y in the chain;

a coupling reaction between an organosilane bearing a function X and at least two functions Y, and a polysilazane;

a coupling reaction between a linear or cyclic precursor POS, bearing at least one function Y and functional with at least one unit attached to a silicon atom in particular of the type -alkylene (straight-chain or branched, $C_6$–$C_2$)—OH, -alkylene (straight-chain or branched, $C_2$–$C_6$)—$NR^6H$ or -alkylene (straight-chain or branched, $C_2$–$C_6$)—COOH, and a reactive compound capable of reacting with the aforementioned unit(s) to give rise to the desired function X;

an esterification reaction for a linear or cyclic POS, bearing at least one function Y and at least one function X of formula (II/2) or (II/3) in which the symbol W represents a COOH group.

More precisely, these POS may be prepared by a process which consists, for, example:

(a) of hydrolysing in aqueous medium an organosilane of formula:

in which the symbols R2 and X have the definitions given above, possibly operating in the presence of an organosilane of formula:

Such a process is well suited for preparing multifunctional POS of formula (III) in which the symbols $T^1$ and T2 each represent the unit $HO_{1/2}$ and in which on one hand p=r=s=0 and on the other hand q is either equal to zero [when the silane (IV) is hydrolyzed in the absence of the silane (V)], or a number other than zero [when the silane (IV) is hydrolyzed in the presence of the silane (V)]. As far as the practical manner of implementing this process is concerned, reference can be made to the contents of FR-A-2 514 013 for more details;

(b) of condensing, possibly in the presence of a catalyst based-on for example a tin carboxylate, an organosilane of formula:

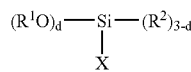

(VI)

in which the symbols $R^1$, $R^2$ and X are as defined above and d is a number selected from among 2 or 3, with a POS of formula.

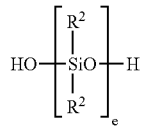

(VII)

in which the symbol $R^2$ is as defined above and e is an integer or fractional number from 2 to 50. Such a process is well suited for preparing multifunctional POS of formula (III) in which the symbols $T^1$ and $T^2$ represent a mixture of $HO_{1/2}$ units with $R^1O_{1/2}$ units and in which the symbols p, r and s may be other than zero when d 3, while q is other than zero, whatever the value of d. As far as the practical manner of implementing this process is concerned, reference may be made to the contents of U.S. Pat. No. 3,755,351 for more details;

(c) of effecting a reaction of redistribution and equilibration, in the presence of a suitable catalyst and water, between on one hand an organosilane of formula:

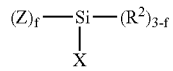

(VIII)

in which the symbol $R^2$ and X are as defined above, the symbol Z is selected from among the radicals hydroxyl, $R^1O$ and halo (such as, for example, chlorine) and f is an integer selected from among 2 or 3, and on the other hand an organocyclosiloxane of formula:

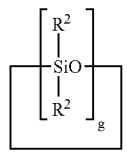

(IX)

in which the symbols $R^2$ are as defined above and g is an integer from between 3 and 8, and possibly a dihydroxylated POS of formula (VII). Such a process is well suited for preparing POS of formula (III) in which the symbols $T^1$ and $T^2$ represent the units $HO_{1/2}$ and the symbol q is other than zero.

The coupling agents or components C which are preferably used within the scope of the invention are POS/1 of imide type.

A first advantageous method of operation for preparing such POS in formula (III) of which the symbol q is equal to zero consists of effecting the following steps (d1) and (d2):

(d1) there are reacted:

an organosilane of formula (VI) in which the symbol X represents the function of formula (II/2) in which $V=\!\!=\!\!-NR^6$ with $R^6=H$, $R^5$ is other than a $COOR^7$ group and $W=COOR^7$ with $R^7=H$, that is to say an organosilane of formula:

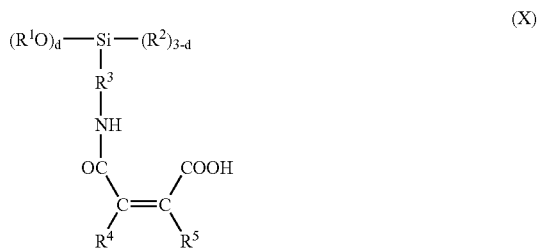

(X)

with a disilazane of formula:

(XI)

in which formula the symbols $R^1$, $R^2$, $R^3$, $R^{4}$ and $R^5$ are as defined above and d is an integer selected from among 2 or 3, this reaction being carried out in the presence of a catalyst, whether or not supported on an inorganic material (such as, for example a siliceous material), based on at least one Lewis acid, operating at atmospheric pressure and at a temperature within the range from ambient temperature (23° C.) to 150° C., and, preferably, from 60° C. to 120° C.;

(d2) the reaction medium obtained is stabilised by treating it with at least one halosilane of formula $(R^2)^3$ Si-halo in which the halo radical is preferably selected from among an atom of chlorine or bromine, operating in the presence of at least one inorganic base which is non-nucleophilic and non-reactive with respect to the imide function formed in situ during the step (d1).

The disilazane is used in a quantity at least equal to 0.5 moles per 1 mole of starting organosilane and, preferably, of from 1 to 5 moles per 1 mole of organosilane.

The preferred Lewis acid is $ZnCl_2$ and/or $ZnBr_2$ and/or $ZnI_2$. It is used in a quantity at least equal to 0.5 moles per 1 mole of organosilane and, preferably, of from 1 to 2 moles per 1 mole of organosilane.

The reaction is carried out in a heterogeneous medium, preferably in the presence of a solvent or a mixture of solvents common to the organosilicic reagents. The preferred solvents are of polar aprotic type such as, for example, chlorobenzene, toluene, xylene, hexane, octane or decane. The solvents more preferably used are toluene and xylene.

This process (d) can be carried out using any known operating method. One operating method which is well suited is the following: in a first phase, the reactor is supplied with the Lewis acid, then a solution of the organosilane is gradually poured into all or part of the solvent(s); in a second phase, the reaction mixture is brought to the chosen temperature, then the disilazane, which may possibly be used in the form of a solution, is poured into part of the solvent(s); then, in a third phase, the reaction mixture obtained is treated with at least one halosilane in the presence of one or more organic base(s) in order to stabilize it; and finally, in a fourth phase, the stabilized reaction medium is filtered to eliminate the Lewis acid and the salt formed in situ during the stabilization, then it is subjected to devolatilization at reduced pressure to eliminate the solvent(s).

With regard to the stabilization stage (d2), the halosilane(s) is (are) used in a quantity at least equal to 0.5 moles per 1 mole of starting organosilane and, preferably, from 0.5 to 1.5 moles per 1 mole of organosilane. With regard to the organic bases, those which are preferred are in particular tertiary aliphatic amines (such as, for example, N-methylmorpholine, triethylamine, triisopropylamine) and sterically hindered cyclic amines (such as, for example, tetraalkyl-2,2,6,6-piperidines). The organic base(s) is (are) used in a quantity at least equal to 0.5 moles per 1 mole of starting organosilane and, preferably, from 0.5 to 1.5 moles per 1 mole of organosilane.

A second operating method—hereafter referred to as process (e)—which is advantageous for preparing such POS in the formula (III) of which the symbol q is other than zero consists of effecting the single step (d1) defined previously, but in which the disilazane of formula (XI) has been replaced by a cyclic polysilazane of formula:

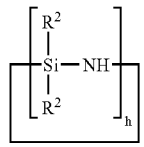

(XII)

in which the symbols R2 are as defined above and h is an integer from 3 to 8.

This second process can be carried out using the operating method which is well-suited, presented above with regard to the implementation of process (d), and based on the effecting of only the first, second and fourth phases which have been mentioned above. It should however be noted that the polysilazane is used in a quantity at least equal to 0.5/h mole per 1 mole of starting organosilane and, preferably, from 1/h to 5/h moles per 1 mole of organosilane (h being the number of silazane units in the polysilazane of formula (XII)).

Carrying out processes (d) and (e), like carrying out processes (f), (g) and (h) which are set forth further below in the present specification, results in obtaining a coupling agent or component C which may be in the form of a multifunctional POS in the pure state or in the form of a mixture of a multifunctional POS with a variable quantity by weight (generally far less than 50% in the mixture) of another (or other) compound(s) which may consist, for example, of:

(i) a small quantity of the starting organosilane of formula (X) not having reacted; and/or
(ii) a small quantity of the organosilane of formula:

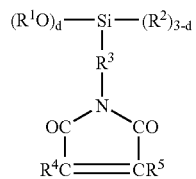

(XIII)

formed by direct cyclization of the corresponding quantity of the starting organosilane of formula (X); and/or (iii) a small quantity of the cyclic monofunctional POS of formula:

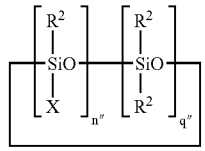

(XIV)

in which:
the symbols $R^2$ are as defined above;
the symbols X are as defined above for POS/1 of imide type;
the symbols n" and q" are integers or fractional numbers which meet the following cumulative conditions:
n" and q" each lie within the range from 1 to 9;
the total n"+q" lies within the range from 3 to 10, said cyclic monofunctional POS having resulted from a modification of the silicone skeleton of the desired multifunctional POS.

Other POS which can be preferably used within the scope of the invention are POS/2 of acid type or of ester type.

One advantageous operating method—hereafter referred to as process (f)—usable for preparing POS/2 of acid type consists of performing a coupling reaction between:

on one hand an essentially straight-chain aminated POS, having the same formula (III) given above with respect to the definition of POS/2, but in which the symbol X is now an aminated function of formula —R3-NR6H (R3 and R6 defined above); said aminated POS is represented in abbreviated form, hereafter, by the simplified formula:

Si—R$^3$—NR$^6$H     (XV)

and on the other hand the maleic anhydride or one of its derivatives of formula:

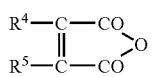

(XVI)

in which the symbols R4 and R5 are as defined above for formula (II).

The aminated POS of formula (XV) may be prepared, in a manner known per se, by effecting for example a reaction of redistribution and equilibration between on one hand a POS which results from hydrolysis of an alkoxysilane bearing an aminated function of formula:

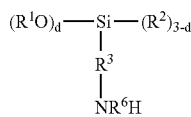

(XVII)

in which the symbols $R^1$, $R^2$, d, $R^3$ and $R^6$ are as defined above with respect to formulae (VI) to (XV), and on the other hand an α,ω-dihydroxylated POS of formula (VII).

As far as the practical manner of implementing the coupling reaction between the aminated POS (XV) and the maleic anhydride (XVI) is concerned, this is a reaction known per se, usually carried out at a temperature from ambient temperature (23° C.) to 80° C., operating in the presence of a solvent or a mixture of solvents. Reference can be made to the contents of U.S. Pat. No. 3,701,795 for more details.

Other preferred POS, POS/2 of ester type, may be prepared by esterification of an intermediate maleamic acid POS by effecting the following steps: (g1) coupling reaction, as explained above with reference to process (f), between the aminated POS (XV) and the maleic anhydride (XVI), then (g2) esterification reaction of the medium comprising the POS/2 of acid type formed, resulting in the compound comprising the desired POS/2 of ester type, by applying the following synthesis process:

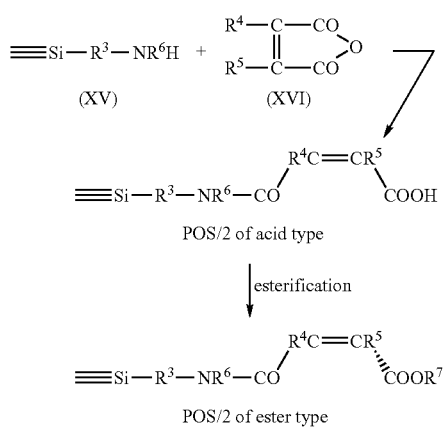

As far as the practical manner of implementing step (g2) is concerned, reference can be made for more details to the contents of the following documents, which describe, possibly starting from other reagents, operating methods applicable to performing this step:

(i) reaction of the ammonium salt of carboxylic acid with an agent such as the organic sulfate of formula $(R^7)_2SO_4$ or the organic iodide of formula $R^7I$: cf. in particular Can. J. Chem., 65, 1987, pages 2179–2181 and Tetrahedron Letters No. 9, pages 689–692, 1973;

(ii) reaction of the chloride of carboxylic acid with the alcohol of formula $R^7OH$ in the presence of an aminated base: cf. in particular Heterocycles, 39, 2, 1994, pages 767–778 and J. Org. Chem., 26, 1961, pages 697–700;

(iii) transesterification reaction in the presence of an ester such as the formate of formula $H-COOR^7$: cf. in particular Justus Liebigs Ann. Chem., 640, 1961, pages 142–144 and J. Chem. Soc., 1950, pages 3375–3377;

(iv) methylation reaction by diazomethane which makes it possible readily to prepare the methyl ester: cf. in particular Justus Liebigs Ann. Chem., 488, 1931, pages 211–227;

(v) direct esterification reaction by the alcohol $R^7-OH$: cf. in particular Org. Syn. Coll., vol. 1, pages 237 and 451, 1941 and J. Org. Chem., 52, 1987, page 4689.

According to a second process (h), which corresponds to a preferred synthesis method, the POS/2 of ester type may be prepared by formation of an amide function by adding the amine POS (XV) to an ester derivative (XIX) obtained from a mono-ester of maleic acid (XVIII), by performing the following steps: (h1) alcoholysis of the maleic anhydride (XVI) by the alcohol $R^7-OH$, (h2) activation of the carboxylic acid function of the mono-ester of the maleic acid (XVIII) obtained, using the various methods of activation described within the field of peptide synthesis, to result in the activated ester derivative (XIX), then (h3) addition of the aminated POS (XV) to said activated ester derivative (XIX) to result in the compound comprising the desired POS/2 of ester type, by applying the following synthesis scheme:

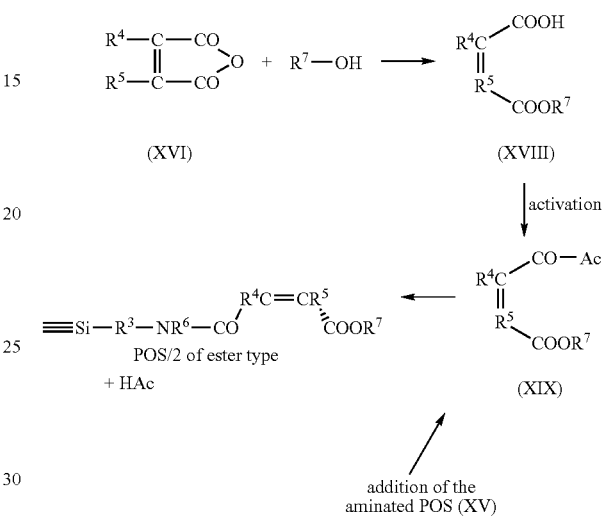

in which the symbol Ac of the derivative (XIX) represents an activating function.

As far as the practical manner of implementing steps (h1) to (h3) is concerned, reference can be made to the contents of the following documents for more details, which documents describe, possibly starting from other reagents, operating methods applicable to the performance of the different steps of the process in question:

for step (h1): cf. in particular J. Med. Chem., 1983, 26, pages 174–181;

for steps (h2) and (h3): cf. John JONES, Amino Acid and Peptide-Synthesis, pages 25–41, Oxford University Press, 1994.

In order to permit the addition of the amine function to the carboxylic acid function of the mono-ester of maleic acid (XVIII), it is advisable first to activate said carboxylic acid function, and this activation can be accomplished in particular using the following methods:

(j) activation by reaction with an alkylchloroformate, in accordance with the process:

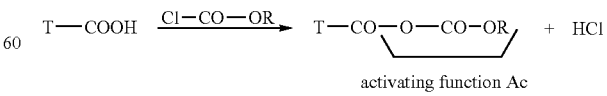

in which T represents the radical $-R^4C=CR^5-COOR^7$ and R represents a straight-chain alkyl radical having for example 1 to 3 carbon atoms;

(2j) activation by reaction with dicyclohexylcarbodiimide (DCCI) in the presence of preferably N-hydroxysuccinimide (HO—SN), in accordance with the process:

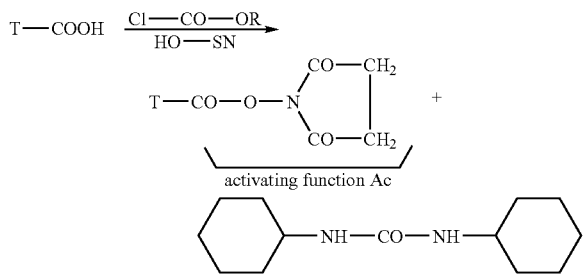

(3j) activation by reaction with a chlorine compound such as, for example thionyl chloride, phosphorus pentachloride, in accordance with the equation:

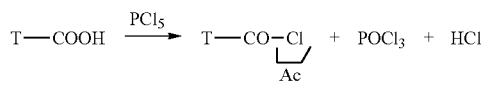

The methods of activation (j) and (2j) are especially preferred.

To return to the general processes (b) and (c) for preparation of the multifunctional POS, they may be performed advantageously starting, for example, with an organosilane of formula:

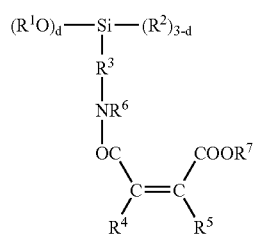

(XX)

in which the symbols $R^1$, $R^2$, d, $R^3$, $R^6$, $R^4$, $R^5$ and $R^7$ (different from H) are as defined above (formulae II and VI).

Such organosilanes are products which may be prepared by applying one or the other of processes (g1) and (g2) described above, in the performance of which the aminated POS (XV) will be replaced by the aminated alkoxysilane of formula (XVII).

Finally, it will be understood that, generally, component C may be in the form of a multifunctional POS in the pure state or in the form of a mixture of such a POS with a variable quantity by weight (preferably less than 50% by weight of this mixture) of one or more other compounds which may consist for example of:

(i) one and/or the other of the starting reagents from which the multifunctional POS are prepared, when the amount of transformation of said reagents is not complete; and/or (ii) the product(s) resulting from complete or incomplete modification of the silicone skeleton of the starting reagent(s); and/or (iii) the product(s) resulting from a modification of the silicone skeleton of the desired multifunctional POS, produced by a condensation reaction, a hydrolysis and condensation reaction and/or a redistribution reaction.

The POS previous described comprising, grafted on their silicon atoms, hydroxyl or hydrolysable functions on one hand and groups bearing an activated ethylene double bond on the other hand, have proved sufficiently effective on their own for coupling an isoprene elastomer and a reinforcing inorganic filler such as silica. Although this is not limiting, they may advantageously constitute the sole coupling agent present in the rubber compositions of the invention when the diene elastomer consists exclusively of an isoprene elastomer, in particular natural rubber or synthetic cis-1,4 polyisoprene.

The content of component (C) is preferably greater than 0.5 phi, more preferably greater than 1 phi and less than 15 phi. Below the minimum amounts indicated, the effect risks being inadequate, whereas beyond the maximum amount indicated generally no further improvement in the coupling is observed, while the costs of the composition increase. For these reasons, this content of component C is more preferably between 2 and 10 phi.

The person skilled in the art will be able to adjust this content of component C according to the intended application, in particular to the part of the tire for which the rubber composition of the invention is intended, to the nature of the isoprene elastomer and to the quantity of reinforcing inorganic filler used. Of course, in order to reduce the costs of the rubber compositions, it is desirable to use as little as possible thereof, that is to say what is just necessary for sufficient coupling between the isoprene elastomer and the reinforcing inorganic filler. The effectiveness of the activated ethylene double bond makes it possible, in a large number of cases, to use the POS in a preferred amount of between 0.5% and 20% by weight relative to the quantity of reinforcing inorganic filler; amounts less than 15% are more particularly preferred.

The person skilled in the art will understand that the POS previously described might be grafted beforehand on to the reinforcing inorganic fillers, in particular to silica, by means of their function(s) Y, the reinforcing inorganic fillers thus precoupled then being able to be linked to the isoprene elastomer by means of their free function(s) X having an activated ethylene double bond.

Various Additives:

Of course, the rubber compositions according to the invention also comprise all or part of the additives usually used in rubber compositions comprising an isoprene elastomer and intended for the manufacture of tires, such as, for example, plasticizers, protective agents such as anti-ozone waxes, chemical antiozonants, antioxidants, anti-wear agents, adhesion promoters, a cross-linking system such as those based either on sulfur or on sulfur donors, vulcanization accelerators and activators, etc. There may also be associated with the reinforcing inorganic filler, if necessary, a conventional poorly reinforcing or non-reinforcing white filler, such as particles of clay, bentonite, talc, chalk, kaolin or titanium oxides.

The rubber compositions according to the invention may also contain, in addition to the POS (component C) previously described, agents for covering the reinforcing inorganic filler, comprising for example the single function Y, or more generally processing aids liable, in known manner, owing to an improvement in the dispersion of the inorganic filler in the rubber matrix and to a reduction in the viscosity of the compositions, to improve their ability to be worked in the uncured state, these agents, used for example in a preferred amount of between 0.5 and 3 phr, being, for example, alkylalkoxysilanes, in particular alkyltriethoxysilanes, such as, for example, 1-octyl-triethoxysilane sold by Degussa-Hüls under the name Dynasylan Octeo or 1-hexadecyl-triethoxysilane sold by Degussa-Hüls under the name Si216, polyols, polyethers, (for example polyethylene glycols), primary, secondary or tertiary amines, (for example trialkanolamines), hydroxylated or hydrolysable polyorganosiloxanes, for example $\alpha,\omega$-dihydroxy-polyorganosiloxanes (in particular $\alpha,\omega$-dihydroxy-polydimethylsiloxanes).

As explained previously, the compositions according to the invention may also contain coupling agents other than component C, for example polysulfurized alkoxysilanes, when these compositions contain, in addition to the isoprene elastomer, other diene elastomers, for example of the SBR and/or BR type, the coupling of which to the reinforcing inorganic filler may then be advantageously effected by conventional coupling agents such as polysulfurized alkoxysilanes.

Preparation of the Rubber Compositions:

The compositions are produced in suitable mixers, using two successive preparation phases well-known to the person skilled in the art: a first phase of thermomechanical working or kneading (sometimes referred to as "non-productive" phase) at high temperature, up to a maximum temperature ($T_{max}$) of between 110° C. and 190° C., preferably between 130° C. and 180° C., followed by a second phase of mechanical working (sometimes referred to as "productive" phase) at lower temperature, typically less than 110° C., for example between 60° C. and 100° C., during which finishing phase the cross-linking or vulcanization system is incorporated; such phases have been described, for example, in the aforementioned application EP 501227.

The production process according to the invention is characterized in that at least component B and component C are incorporated by kneading into component A during the first, so-called non-productive, phase, that is to say that at least these different base constituents are introduced into the mixer and are kneaded thermomechanically, in one or more stages, until a maximum temperature of between 110° C. and 190° C., preferably between 130° C. and 180° C., is reached.

By way of example, the first (non-productive) phase is effected in a single thermomechanical step during which all the base constituents necessary, any additional covering agents or processing agents and various other additives, with the exception of the vulcanization system, are introduced into a suitable internal mixer, such as a conventional internal mixer. A second stage of thermomechanical working may be added, in this internal mixer, after the mixture has dropped and after intermediate cooling (cooling temperature preferably less than 100° C.), with the aim of making the compositions undergo complementary heat treatment, in particular in order to improve further the dispersion, in the elastomeric matrix, of the reinforcing inorganic filler and its coupling agent. The total duration of the kneading, in this non-productive phase, is preferably between 2 and 10 minutes.

After cooling of the mixture thus obtained, the vulcanization system is then incorporated at low temperature, generally in an external mixer such as an open mill; the entire composition is then mixed (productive phase) for several minutes, for example between 5 and 15 minutes.

The final composition thus obtained is then calendered, for example in the form of a film, a sheet or alternatively a rubber profiled element usable for manufacturing semi-finished products such as treads, crown plies, sidewalls, carcass plies, beads, protectors, inner tubes or airtight internal rubbers for tubeless tires.

The vulcanization (or curing) is carried out in known manner at a temperature generally between 130° C. and 200° C., for a sufficient time which may vary, for example, between 5 and 90 minutes, depending, in particular, on the curing temperature, the vulcanization system adopted and the vulcanization kinetics of the composition in question.

The vulcanization system proper is preferably based on sulfur and a primary vulcanization accelerator, in particular an accelerator of the sulfenamide type. To this basic vulcanization system there are added, incorporated during the first non-productive phase and/or during the productive phase, various known secondary accelerators or vulcanization activators such as zinc oxide, stearic acid, guanidine derivatives (in particular diphenylguanidine), etc. The sulfur is used in a preferred amount of between 0.5 and 10 phr, more preferably of between 0.5 and 5.0 phr, for example between 0.5 and 3.0 phr when the invention is applied to a tire tread. The primary vulcanization accelerator is used in a preferred amount of between 0.5 and 10 phr, more preferably of between 0.5 and 5.0 phr in particular when the invention applies to a tire tread.

It goes without saying that the invention relates to the rubber compositions previously described, both in the "uncured" state (i.e. before curing) and in the "cured" or vulcanized state (i.e. after cross-linking or vulcanization).

Of course, the compositions according to the invention may be used alone or in a blend (i.e. in a mixture) with any other rubber composition which can be used for manufacturing tires.

EXAMPLES

Synthesis of the POS Coupling Agents:

Synthesis of POS "A":

A POS/1 of imide type is prepared, with as starting organosilane of formula (X), N-[γ-propyl(methyldiethoxy)silane]maleamic acid, in accordance with the following steps.

1. Preparation of the Starting Maleamic Acid Silane:

Operation is in a 2-liter glass reactor, equipped with a stirrer system and a dropping funnel. The γ-aminopropylsilane of formula $(C_2H_5O)_2CH_3Si(CH_2)_3NH_2$ (300.3 g, or 1.570 moles) is poured gradually at a temperature of 13–15° C. (temperature of the reaction kept at this value by means of a bath of iced water placed beneath the reactor) on to a solution of maleic anhydride (160 g, or 1.633 moles) in toluene as solvent (569.9 g), over a period of 2 hours and 20 minutes. The reaction medium is then left at 23° C. for 15 hours. At the end of this period, the reaction medium is filtered over a fritted glass of a porosity of 3 and thus a solution of the maleamic acid silane desired in toluene is recovered, which solution is used in the form in which it is present for implementing process (e) below. This solution contains 0.152 moles of maleamic acid silane per 100 g of solution.

2. Synthesis of the POS:

It is effected by implementing process (e) previously described, in accordance with the following steps:

1st phase: $ZnCl_2$ (94.6 g, or 0.694 moles) is introduced into a 3-litre glass reactor, equipped with a stirrer system and a dropping funnel, then the solid is heated to 80° C. for 1 hour 30 minutes at a reduced pressure of $4 \times 10^2$ Pa; the reactor is then brought back to atmospheric pressure by operating under an argon atmosphere and then 150 cm³ of toluene, then gradually 413.5 g of maleamic acid silane (181.8 g, or 0.629 moles) in toluene obtained previously in point 1 is poured in;

2$^{nd}$ phase: the dropping funnel is charged with cyclic hexamethyltrisilazane (51.2 g, or 0.233 moles) and with 200 cm³ of toluene; the temperature of the reaction medium is 90° C., then the cyclic hexamethyltrisilazane is poured in gradually over a period of 50 minutes; at the end of pouring, the orangey organic solution obtained is heated to a temperature of 80° C. and is kept at this temperature for 15 hours;

4$^{th}$ phase: the reaction medium is filtered over "filter board", then the toluene is eliminated after devolatilization at reduced pressure.

Thus a yellow oil is obtained which was subjected to NMR analysis of the proton and NMR analysis of the silicon (²⁹Si). The results of these analyses reveal that the product of the reaction (POS A) contains approximately:

81.5% by weight of polymer POS/1 of imide type in the form of an oligomer of average formula:

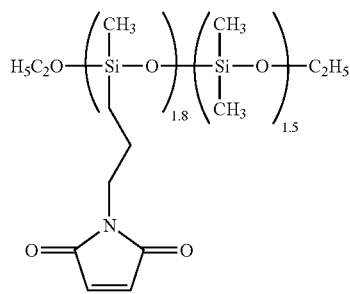

18.5% by weight of the organosilane of formula:

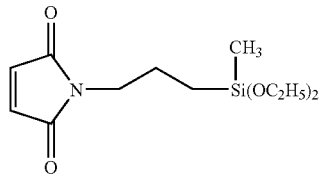

Synthesis of POS "B":

A POS/2 of ester type is prepared by implementing process (h) described previously, with activation method (2j), in accordance with the following steps.

1. Alcoholysis of the Maleic Anhydride:

The maleic anhydride (698.1 g, or 7.12 moles) is introduced into a 2-liter four-necked reactor, then it is melted by heating the reactor using an oil bath brought to 70° C. Once all the anhydride has melted, methanol (221.4 g, or 6.92 moles) is introduced, with stirring, via a dropping funnel. The medium is then left being stirred for 20 hours at 23° C., then it is devolatilized by establishing a reduced pressure of 10×10² Pa for 1 hour, and finally it is filtered on filter paper. Thus 786.9 g of monomethylester of the maleic acid of the following formula is recovered (yield 86%):

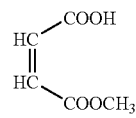

2. Preparation of the Ester Derivative Activated in Accordance with Activation Method (2j):

There are introduced into a 2-liter glass reactor, equipped with mechanical stirring and a dropping funnel: N-hydroxysuccinimide (105.4 g, or 0.916 moles), tetrahydrofuran as solvent (400 cm³) and the monomethylester of maleic acid (100.9 g, or 0.776 moles). The reaction medium is stirred, and the dicyclohexylcarbodiimide (206.2 g, or 1.001 moles) is poured in gradually, at ambient temperature (23° C.), over a period of 10 minutes. The medium becomes heterogeneous because of the precipitation of dicyclohexylurea.

After a reaction period of 110 minutes, the reaction medium is filtered on a "Büchner funnel" and the filtrate is concentrated by evaporation at a temperature not exceeding 35° C. The residual reaction medium is left at a temperature of 4° C. for 15 hours, then it is again filtered over a fritted glass containing 10 cm of silica. The second filtrate obtained is completely devolatilized at reduced pressure to eliminate the remaining solvent and the solid finally obtained is then recrystallized in a CH₂Cl₂/ethylene ether mixture.

Thus 43.3 g (yield of 25%) of the activated ester derivative of the following formula is recovered:

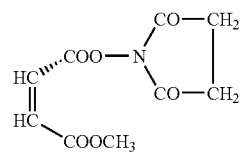

3. Preparation of the Aminated POS:

γ-aminopropylsilane of formula (C₂H₅O)₂ CH₃Si(CH₂)₃ NH₂ (1700.3 g, or 8.9 moles) is introduced into a 4-liter glass reactor provided with mechanical stirring and a reflux condenser. The water (1442.5 g, or 80.13 moles) is poured in by means of a flow pump having a flow rate of 10 cm³/hour. The reaction is exothermic throughout the pouring and the temperature is not regulated.

At the end of 3 hours' reaction, a water-ethanol mixture is eliminated at a reduced pressure of 100 Pa, firstly at 40° C., then at 70° C. in order to eliminate the ethanol completely and thus result in an intermediate aminated oil.

350.24 g of the intermediate aminated oil obtained at the end of the preceding step, a α,ω-dihydroxylated polydimethylsiloxane oil (230.92 g) having a viscosity of 50 MPa at 25° C. and containing 12% by weight of OH, and catalyst based on potassium siliconate (0.0416 g) are introduced into another 1-liter reactor, also provided with mechanical stirring and a condenser. The reaction medium is heated to 90° C. for 6 hours.

At the end of this time, the reaction medium is left for 15 hours at ambient temperature (23° C.), then is neutralized using 0.0974 g of a mixture based on phosphoric acid and polydimethylsiloxane oligomers, by operating at 90° C. for 1 hour. The reaction medium obtained is filtered over a microporous filter of 0.5 μm.

The aminated POS obtained was subjected to NMR analysis of the proton and the silicon. The results of these NMR analyses reveal a mixture of linear (74% molar) and cyclic (26% molar) structures having the following average formulae:

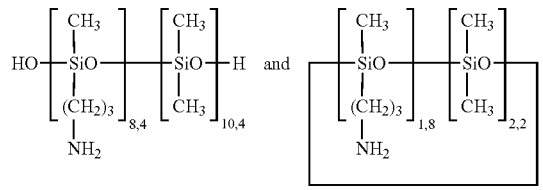

The POS thus obtained contains 0.51 amine function per 100 g of product.

4. Preparation of Compound A Comprising a Polymer POS/2 of Ester Type by Coupling of the Activated Ester Derivative with the Aminated POS:

The activated ester derivative as prepared in point 2 above (19.88 g, or 0.088 moles) is introduced into a four-necked reactor with 100 cm³ of $CH_2Cl_2$ as solvent. The aminated POS as prepared in point 3 above (15.62 g) is solubilized in 100 cm³ of $CH_2Cl_2$, then the solution is introduced into a dropping funnel. Pouring is effected gradually over a period of one hour, on to a reaction medium which has been cooled to 5° C. beforehand by a bath of iced water.

Once pouring has finished, the reaction medium is caused to react at ambient temperature (23° C.) for 15 hours. At the end of this time, the medium is decanted into a separation funnel, then washed 4 times in succession with water. It is necessary to add an aqueous solution saturated in NaCl to help separate the phases. The residual organic phase is recovered, dried over $MgSO_4$, and then filtered on filter paper and finally the solvent is eliminated at reduced pressure and at ambient temperature (23° C.).

Thus an oil is obtained which was subjected to NMR analysis of the proton and NMR analysis of the silicon ($^{29}Si$).

The results of these analyses reveal that the product (POS B) thus synthesized contains approximately:

94% by weight of polymer POS/2 of ester type of average formula:

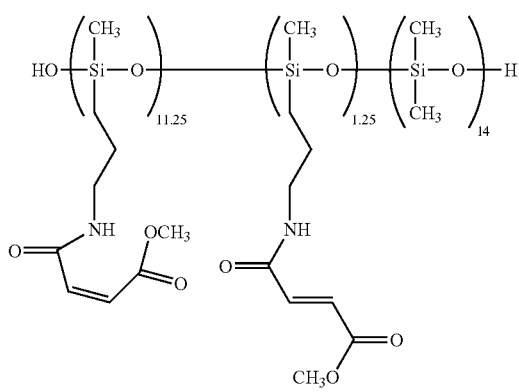

6% by weight of the cyclic monofunctional POS of average formula:

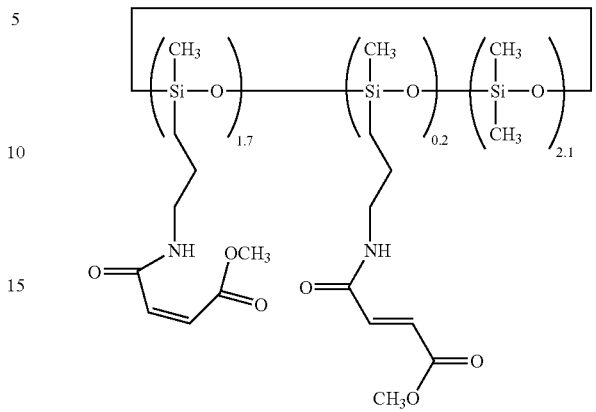

Preparation of the Rubber Compositions:

For the following tests, the procedure is as follows: the isoprene elastomer (or the mixture of diene elastomers, if applicable), the reinforcing filler, the coupling system, then the various other ingredients, with the exception of the vulcanization system, are introduced into an internal mixer filled to 70%, the initial tank temperature of which is approximately 60° C. Thermomechanical working (non-productive phase) is then performed in one or two stages (total duration of kneading equal to about 7 minutes), until a maximum "dropping" temperature of about 165° C. is reached. The mixture thus obtained is recovered, it is cooled and then sulfur and sulfenamide are added on an external mixer (homo-finisher) at 30° C., by mixing everything (productive phase) for 3 to 4 minutes.

The compositions thus obtained are then calendered either in the form of sheets (thickness of 2 to 3 mm) or of thin films of rubber in order to measure their physical or mechanical properties, or in the form of profiled elements which can be used directly, after cutting out and/or assembly to the desired dimensions, as semi-finished products for tires, in particular as treads for tires for trucks.

In the tests which follow, the isoprene elastomer used is natural rubber and the reinforcing inorganic filler (silica or silica/alumina blend), used in a preferred amount of between 30 and 80 phr, constitutes all or the majority of the total reinforcing filler, a fraction of this total reinforcing filler possibly being formed of carbon black.

Characterization Tests:

Test 1:

The object of this test is to demonstrate the improved (inorganic filler/isoprene elastomer) coupling performance in a composition according to the invention, compared with a composition of the prior art using a conventional TESPT coupling agent.

For this, two rubber compositions based on natural rubber and reinforced with silica are prepared, these compositions being intended for treads for truck tires;

These two compositions are identical except for the following differences:

composition No. 1 (control): conventional TESPT coupling agent;

composition No. 2 (according to the invention): POS A.

The two coupling agents tested are used in an isomolar amount of functions X, that is to say that, whatever the composition tested, the same number of moles of functions X which are active with respect to the polyisoprene is used.

Relative to the weight of polyisoprene, the amount of TESPT and the amount of the POS are in both cases less than 5 phi, this quantity representing in both cases less than 10% by weight relative to the quantity of reinforcing inorganic filler.

Tables 1 and 2 show the formulation of the different compositions (Table 1—amounts of the different products expressed in phr or phi), and their properties before and after curing (25 min at 150° C.); the vulcanization system is formed of sulfur and sulfenamide.

TABLE 1

|  | Composition No.: | |
| --- | --- | --- |
|  | 1 | 2 |
| NR (1) | 100 | 100 |
| silica (2) | 50 | 50 |
| silane (3) | 4.0 | — |
| POS (4) | — | 4.6 |
| ZnO | 3 | 3 |
| stearic acid | 2.5 | 2.5 |
| antioxidant (5) | 1.9 | 1.9 |
| sulfur | 1.5 | 1.5 |
| accelerator (6) | 1.8 | 1.8 |

(1) natural rubber;
(2) silica type "HD" - "Zeosil 1165 MP" from Rhodia in the form of microbeads (BET and CTAB: approximately 150–160 m2/g);
(3) TESPT coupling agent ("Si69" from Degussa);
(4) POS A (having an imide function);
(5) N-1,3-dimethylbutyl-N-phenyl-para-phenylenediamine ("Santoflex 6-PPD" from Flexsys);
(6) N-cyclohexyl-2-benzothiazyl sulfenamide ("Santocure CBS" - from Flexsys)

TABLE 2

|  | Composition No.: | |
| --- | --- | --- |
|  | 1 | 2 |
| Properties before curing: | | |
| Mooney (MU) | 28 | 57 |
| T5 (min) | 24 | 30 |
| Properties after curing: | | |
| M10 (MPa) | 4.84 | 4.06 |
| M100 (MPa) | 1.81 | 1.91 |
| M300 (MPa) | 1.82 | 2.84 |
| M300/M100 | 1.01 | 1.49 |
| tan(δ)$_{max}$ | 0.17 | 0.13 |
| ΔG* | 1.7 | 0.8 |
| Breaking stress (MPa) | 30 | 30 |
| Elongation at break (%) | 650 | 500 |

FIG. 1 shows the curves of modulus (in MPa) as a function of the elongation (in %). These curves are marked C1 and C2, and correspond to compositions No. 1 and No. 2 respectively.

Examination of these different results of Table 2 and of FIG. 1 leads to the following observations:

the scorching times (T5) are sufficiently long in all cases (more than 20 minutes), offering a large safety margin with respect to the problem of scorching;

the Mooney plasticity values remain low (less than 60 MU) whatever the composition in question, which is an indicator of very good ability of the compositions to be processed in the uncured state;

after curing, the composition according to the invention (No. 2) has the highest values of modulus under high deformation (M100 and M300) and of ratio M300/M100, which are clear indicators to the person skilled in the art of better reinforcement provided by the inorganic filler and its POS coupling agent;

the hysteresis properties are improved compared with the composition of the invention, ΔG* in particular being divided by two, which indicates substantially reduced rolling resistance;

it should be deduced from these results that the very substantial increase (doubling) in Mooney viscosity observed on the composition of the invention is due to the formation, during kneading, of additional bonds between the inorganic filler and the polyisoprene, in other words better (inorganic filler/polyisoprene) coupling.

FIG. 1 confirms the preceding observations: the composition of the invention (curve C2) reveals a superior level of reinforcement (modulus) whatever the amount of elongation, in particular at high deformation (elongations of 100% and more); for such a range of elongations, this behavior clearly illustrates a better quality of the bond or coupling between the reinforcing inorganic filler and the isoprene elastomer.

Test 2:

This test shows the superior coupling performances of a POS having an activated ethylene double bond, compared with those of an alkoxysilane also comprising an activated ethylene double bond, namely trimethoxy-silylpropyl methacrylate (abbreviated to TMSPM).

This TMSPM, which is sold by Hüls under the name "Dynasylan Memo", has as its known formula (see for example documents DE-A-43 191 42 or U.S. Pat. No. 5,484,848):

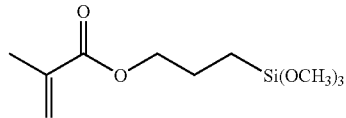

For this test, two rubber compositions similar to compositions 1 and 2 above are prepared, which are based on natural rubber and reinforced with silica, and are intended for treads for truck tires. These two compositions have an identical formulation, with the exception of the coupling agent used:

composition No. 3 (control): TMSPM;
composition No. 4 (according to the invention): POS B.

These two coupling agents are used here in an isomolar amount of functions X. Relative to the weight of polyisoprene, the amount of TESPT and the amount of the POS are in both cases less than 5 pci, that is to say in the present case advantageously less than 10% by weight relative to the quantity of reinforcing inorganic filler.

Tables 3 and 4 show the formulation of the two compositions (Table 3—amounts of the different products expressed in phr or phi), and their properties before and after curing (25 min at 150° C.).

TABLE 3

| | Composition No.: | |
|---|---|---|
| | 3 | 4 |
| NR (1) | 100 | 100 |
| silica (2) | 50 | 50 |
| silane (3) | 3.7 | — |
| POS (4) | — | 4.6 |
| ZnO | 3 | 3 |
| stearic acid | 2.5 | 2.5 |
| antioxidant (5) | 1.9 | 1.9 |
| sulfur | 1.5 | 1.5 |
| accelerator (6) | 1.8 | 1.8 |

(1) (2) (5) and (6) idem Table 1;
(3) trimethoxysilylpropyl methacrylate ("Dynasylan Memo" from Hüls);
(4) POS B (having a maleamic ester function);

TABLE 4

| | Composition No.: | |
|---|---|---|
| | 3 | 4 |
| Properties before curing: | | |
| Mooney (MU) | 34 | 33 |
| T5 (min) | 30 | 30 |
| Properties after curing: | | |
| M10 (MPa) | 3.88 | 5.54 |
| M100 (MPa) | 1.22 | 1.73 |
| M300 (MPa) | 1.26 | 1.96 |
| M300/M100 | 1.03 | 1.13 |
| tan(δ)$_{max}$ | 0.20 | 0.20 |
| ΔG* | 1.9 | 2.4 |
| Breaking stress (MPa) | 32 | 31 |
| Elongation at break (%) | 735 | 640 |

Figure 2:
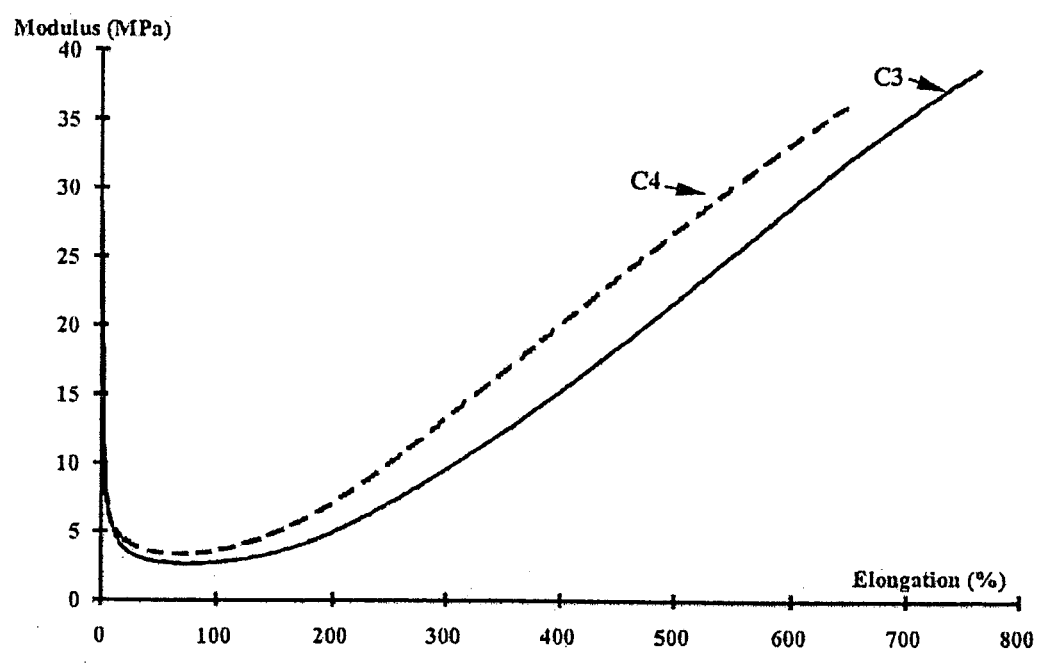
FIG. 2 shows curves of the variation of modulus (in MPa) as a function of elongation (in %) for rubber compositions C3 and C4.

FIG. 2 shows the curves of modulus (in MPa) as a function of the elongation (in %). These curves are marked C3 and C4, and correspond to compositions No. 3 and No. 4 respectively.

Examining the different results of Table 4 shows that the two compositions have very similar and satisfactory properties with regard to scorching times, Mooney plasticities and hysteresis properties. However, one significant difference is noted between the two compositions with regard to the values of modulus at high elongation (M100 and M300) and of ratio M300/M100, which are higher for the composition of the invention; this is a clear indicator for the person skilled in the art of superior reinforcement provided by the POS compared with the alkoxysilane, although the latter also bears an activated ethylene double bond.

FIG. 2 confirms the preceding observations: the composition of the invention (curve C4) exhibits a significantly higher modulus whatever the amount of elongation, in particular at high deformation (elongations of 100% and more), which confirms a better quality of the bond or coupling between the reinforcing inorganic filler and the polyisoprene.

Test 3:

This test illustrates another preferred embodiment of the invention, in which a covering agent for the reinforcing inorganic filler is associated with the POS coupling agent having an activated ethylene double bond (component C).

This covering agent is an α,ω-dihydroxy-polyorganosiloxane, and is incorporated in the composition according to the invention at the same time as the POS coupling agent (non-productive step), to improve the processing in the uncured state (lowering of viscosity) and the dispersion of the inorganic filler in the elastomeric matrix.

For this test, two compositions which are identical, apart from the following differences, are compared:
composition No. 5 (control): TESPT coupling agent (4 phr);
composition No. 6 (invention): POS A (3 phr)+covering agent (1 phr).

Composition No. 5 is the control for the test and contains 8% by weight TESPT relative to the weight of silica. Composition No. 6 is the composition according to the invention and contains advantageously, relative to the weight of silica, less than 8% of the coupling agent having a maleimide function (precisely 6%).

Tables 5 and 6 show the formulation of the different compositions, and their properties before and after curing (150° C., 25 minutes).

TABLE 5

| | Composition No.: | |
|---|---|---|
| | 5 | 6 |
| NR (1) | 100 | 100 |
| silica (2) | 50 | 50 |
| silane (3) | 4.0 | — |
| POS (4) | — | 3.0 |
| PDMS (7) | — | 1 |
| ZnO | 3 | 3 |
| stearic acid | 2.5 | 2.5 |
| antioxidant (5) | 1.9 | 1.9 |
| sulfur | 1.5 | 1.5 |
| accelerator (6) | 1.8 | 1.8 |

(1) to (6) idem Table 1;
(7) α,ω-dihydroxy-polymethylsiloxane (oil "Rhodorsil 48V50" from Rhodia).

TABLE 6

| | Composition No.: | |
|---|---|---|
| | 5 | 6 |
| Properties before curing: | | |
| Mooney (MU) | 29 | 33 |
| T5 (min) | 22 | 27 |
| Properties after curing: | | |
| M10 (MPa) | 4.4 | 5.0 |
| M100 (MPa) | 1.7 | 2.3 |
| M300 (MPa) | 1.8 | 3.1 |
| M300/M100 | 1.1 | 1.4 |
| tan(δ)$_{max}$ | 0.18 | 0.16 |
| ΔG* | 2.1 | 1.4 |
| Breaking stress (MPa) | 29 | 28 |
| Elongation at break (%) | 605 | 450 |

Figure 3:
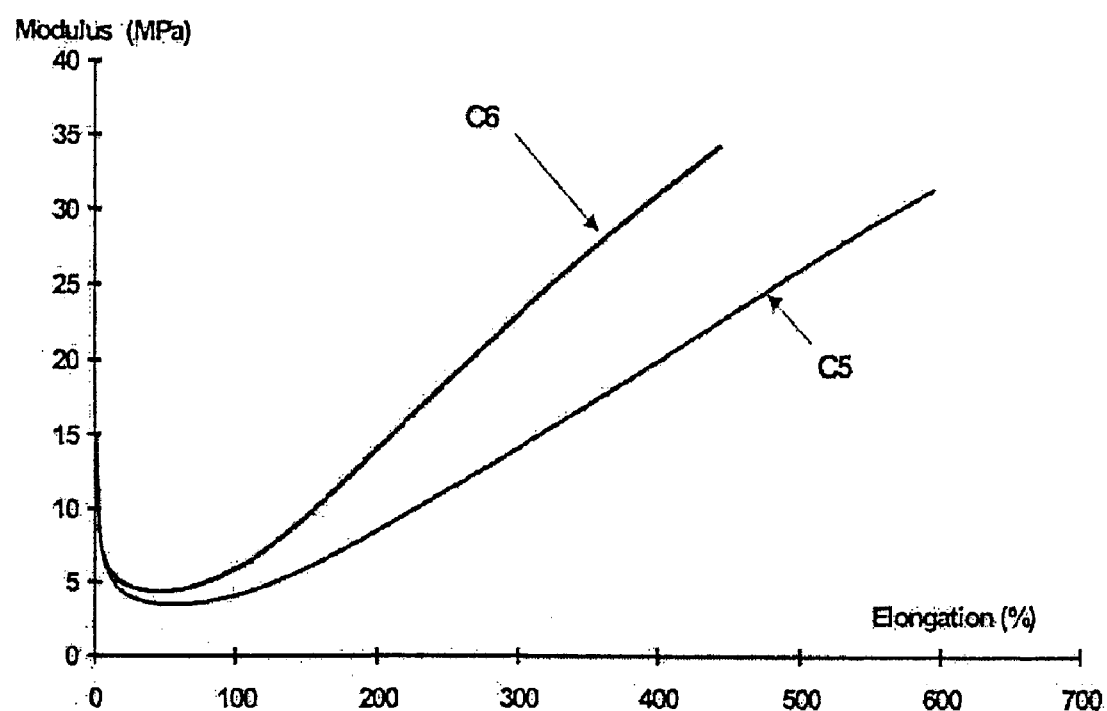
FIG. 3 shows curves of the variation of modulus (in MPa) as a function of elongation (in %) for rubber compositions C5 and C6.

FIG. 3 shows the curves of modulus (in MPa) as a function of the elongation (in %). These curves are marked C5 and C6; and correspond to compositions No. 5 and No. 6 respectively. The vulcanization system is formed of sulfur and sulfenamide.

A study of the different results shows that composition No. 6 according to the invention, compared with the control composition No. 5, has an improved compromise of properties:
low Mooney plasticity in both cases;
resistance to scorching slightly greater;
after curing, moduli at high deformation (M100, M300) and a ratio M300/M100 which are significantly superior, synonymous with better reinforcement and therefore with improved coupling between the elastomer and the reinforcing inorganic filler;

FIG. 3 confirms the preceding observations: composition No. 6 (curve C6) reveals a level of reinforcement (modulus) which is very much superior at high deformation (elongations of 100% and more), compared with the control composition based on TESPT (Curve C5).

It is also composition No. 6 which has the most advantageous compromise with regard to the hysteresis properties: lower tan(δ)max, very substantial reduction in the non-linearity ΔG*.

While making it possible to reduce the amount of coupling agent, the association of the POS having an activated double bond with a covering agent thus offers a particularly advantageous compromise of properties to the compositions reinforced with an inorganic filler such as silica.

Test 4:

This test once again illustrates the beneficial effect of the invention in a composition based on natural rubber, comprising as reinforcing inorganic filler a blend (50/50 by volume) of silica and alumina-(alumina such as described in the aforementioned application EP 810258).

Two compositions which are identical, apart from the following differences, are compared:
composition No. 7: TESPT coupling agent (4 phr);
composition No. 8: POS A (4 phr).

Tables 7 and 8 show the formulation of the different compositions, and their properties before and after curing.

The results show once again, in an isoprene matrix, the overall superiority of the POS coupling agent (composition No. 8) relative to the conventional TESPT coupling agent (composition No. 7), with in particular:

slightly greater resistance to scorching;

higher modulus M300 and ratio (M300/M100);

more advantageous hysteresis properties, as illustrated by a lower value of tan(δ)max and a very significant reduction in the non-linearity ΔG*.

Test 5

This test shows that the POS coupling agent selected results in coupling performances which are insufficient with respect to a diene elastomer other than an isoprene elastomer, and inferior in any case to those offered by a conventional polysulfurized alkoxysilane such as TESPT.

For this, two compositions based on SBR elastomer and reinforced with silica are prepared; these compositions, neither of which are in accordance with the invention, are identical with the exception of the coupling agent used: TESPT for composition No. 9, POS A having an imide function for composition No. 10 (with an isomolar amount of functions X). Composition No. 9 is a control composition used typically for treads for passenger-car tires.

Tables 9 and 10 show the formulation of the different compositions, and their properties before and after curing.

TABLE 7

| | Composition No.: | |
|---|---|---|
| | 7 | 8 |
| NR (1) | 100 | 100 |
| silica (2) | 25 | 25 |
| alumina (7) | 40 | 40 |
| black (8) | 5 | 5 |
| silane (3) | 4 | — |
| POS (4) | — | 4 |
| ZnO | 3 | 3 |
| stearic acid | 2.5 | 2.5 |
| antioxidant (5) | 1.9 | 1.9 |
| sulfur | 1.5 | 1.5 |
| accelerator (6) | 1.8 | 1.8 |

(1) to (6) idem Table 1;
(7) alumina "Baikalox CR125" from Baïkowski (in the form of powder - BET: approximately 105 m²/g);
(8) carbon black N330.

TABLE 8

| | Composition No.: | |
|---|---|---|
| | 7 | 8 |
| Properties before curing: | | |
| Mooney (MU) | 46 | 79 |
| T5 (min) | 12 | 14 |
| Properties after curing: | | |
| M10 (MPa) | 4.6 | 4.1 |
| M100 (MPa) | 1.6 | 1.4 |
| M300 (MPa) | 1.6 | 1.6 |
| M300/M100 | 1 | 1.15 |
| tan(δ)max | 0.18 | 0.16 |
| ΔG* | 1.8 | 1.2 |
| Breaking stress (MPa) | 28 | 24 |
| Elongation at break (%) | 595 | 522 |

TABLE 9

| | Composition No.: | |
|---|---|---|
| | 9 | 10 |
| SBR (1) | 100 | 100 |
| silica (2) | 80 | 80 |
| aromatic extender oil | 37.5 | 37.5 |
| silane (3) | 6.4 | — |
| POS (4) | — | 7.4 |
| ZnO | 2.5 | 2.5 |
| DPG (7) | 1.5 | 1.5 |
| stearic acid | 2 | 2 |
| paraffin (8) | 1.5 | 1.5 |
| antioxidant (5) | 1.9 | 1.9 |
| sulfur | 1.1 | 1.1 |
| accelerator (6) | 2 | 2 |

(1) SBR with 57% of 1,2-polybutadiene units; 25% of styrene; extended with 37.5% of oil; expressed in dry SBR; Tg = −26° C.;
(2) to (6) idem Table 1;
(7) diphenylguanidine ("Vulcacit D" from BAYER);
(8) mixture of macro- and microcrystalline anti-ozone waxes.

TABLE 10

| | Composition No.: | |
|---|---|---|
| | 9 | 10 |
| Properties before curing: | | |
| Mooney (MU) | 59 | 63 |
| T5 (min) | 23 | 99 |
| Properties after curing: | | |
| M10 (MPa) | 5.6 | 6.3 |
| M100 (MPa) | 2.1 | 1.7 |
| M300 (MPa) | 2.9 | 1.9 |
| M300/M100 | 1.4 | 1.2 |
| tan(δ)max | 26 | 36 |
| Breaking stress (MPa) | 21.7 | 21.4 |
| Elongation at break (%) | 444 | 560 |

Figure 4:
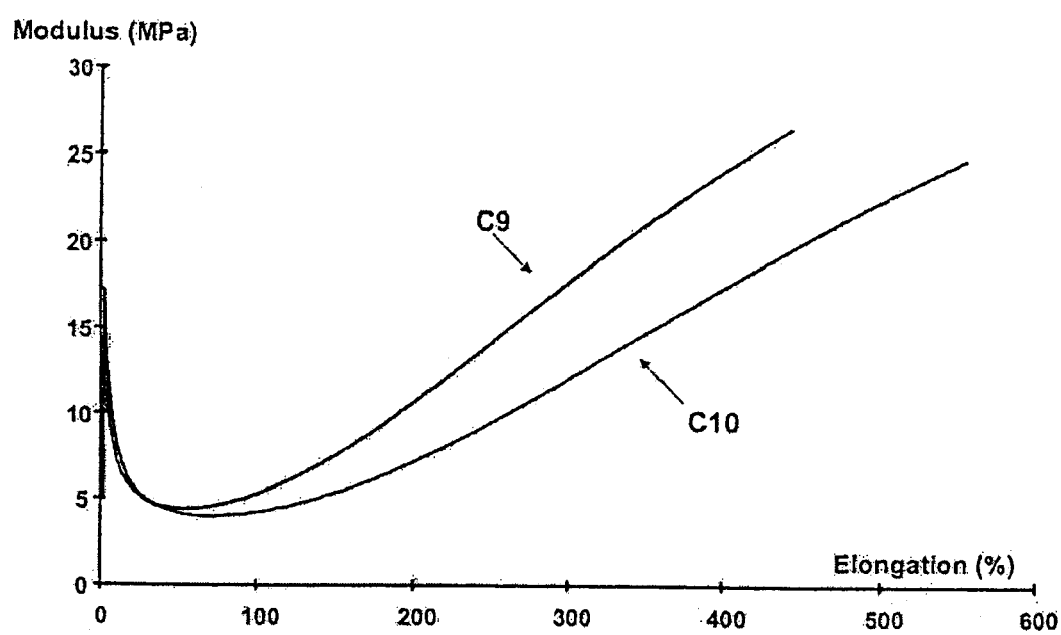
FIG. 4 shows curves of the variation of modulus (in MPa) as a function of elongation (in %) for rubber compositions C9 and C10.

FIG. 4 shows the curves of modulus (in MPa) as a function of the elongation (in %). These curves are marked C9 and C10 and correspond to compositions No. 9 and No. 10 respectively.

Studying the different results of Table 10 shows that composition No. 10 based on POS, compared with the control composition No. 9 based on TESPT, has significantly degraded properties, with in particular:

a very greatly increased scorching time T5 (close to a factor of four), which is redhibitory from the industrial point of view;

after curing, moduli at high deformation (M100, M300) and a ratio M300/M100 which are significantly inferior, which are clear indicators of insufficient reinforcement and therefore coupling between the SBR elastomer and the reinforcing inorganic filler;

FIG. 4 confirms this last observation: composition No. 10 (curve C10) reveals a very inferior level of reinforcement (modulus) at high deformation (elongations of 100% and more), compared with the control composition based on TESPT (Curve C9);

finally, an unfavorable change in the hysteresis (tan(δ)max increased by close to 40%).

The POS coupling agent having an activated ethylene double bond, in order to yield improved performances compared with TESPT, must therefore be associated with an isoprene elastomer and not just any diene elastomer.

In conclusion, the POS coupling agent selected for the compositions according to the invention comprising an isoprene elastomer imparts to the latter mechanical properties which are particularly high in the vulcanized state, while providing them with very good processing properties in the uncured state.

Unpredictably for the person skilled in the art, this multifunctional POS having an activated ethylene double bond exhibits in such compositions a significantly superior performance to that of the polysulfurized alkoxysilane TESPT, which is however considered as generally being the best (inorganic filler/diene elastomer) coupling agent in rubber compositions reinforced with an inorganic filler such as silica.

It also unexpectedly exhibits greater effectiveness than that of other known coupling agents, in this case alkoxysilanes, bearing a activated ethylene double bond.

The invention can be applied particularly advantageously in rubber compositions usable for the manufacture of treads for tires which have both low rolling resistance and high wear resistance, in particular when these treads are exclusively based on natural rubber or synthetic polyisoprene and are intended for tires for industrial vehicles of the truck type.

We claim:

1. A tire elastomeric composition comprising an isoprene elastomer, a reinforcing filler comprising a reinforcing inorganic filler, and an (inorganic filler/isoprene elastomer) coupling agent, wherein the coupling agent is a multifunctional polyorganosiloxane comprising functions denoted as "Y" and "X", wherein the Y function is at least one hydroxyl or hydrolyzable function grafted to the silicon atoms of the coupling agent and the X function is a group bearing at least one activated ethylene double bond and is grafted to the silicon atoms of the coupling agent, wherein the ethylene double bond of the coupling agent is activated by at least one adjacent electron-attracting carbonyl group.

2. The composition according to claim 1, wherein the isoprene elastomer is selected from the group consisting of natural rubber, synthetic polyisoprenes, isoprene copolymers, and mixtures thereof.

3. The composition according to claim 1, wherein the reinforcing inorganic filler is present in an amount of between 10 and 200 parts by weight per one hundred parts of elastomer.

4. The composition according to claim 1, wherein the coupling agent is present in an amount greater than 0.5 parts by weight per one hundred parts of elastomer.

5. The composition according to claim 4, wherein the coupling agent is present in an amount of between 2 and 10 parts by weight per one hundred parts of elastomer.

6. The composition according to claim 1, wherein the polyorganosiloxane comprises siloxyl units, which may be identical or different, having the formula (I):

$$R^2_a Y_b X_c Si\, O_{(4-a-b-c)/2} \tag{I}$$

wherein a, b and c are each integers or fractional numbers from 0 to 3;

wherein the radicals $R^2$ may be identical or different, and wherein the radicals $R^2$ each represent a monovalent hydrocarbon radical;

wherein the radicals Y may be identical or different, and wherein the radicals Y each represent the hydroxyl or hydrolyzable function;

wherein the radicals X may be identical or different, and wherein the radicals X each represent the group bearing at least one activated ethylene double bond;

wherein $0<(a+b+c)\leq 3$; and wherein at least one radical X and at least one radical Y are present in the polyorganosiloxane.

7. The composition according to claim 6, wherein the radicals Y are selected from the group consisting of the radicals hydroxyl (OH) and alkoxyl ($R^1$), wherein $R^1$ is a monovalent straight-chain or branched hydrocarbon group comprising from 1 to 15 carbon atoms.

8. The composition according to claim 7, wherein $R^1$ is selected from the group consisting of $C_1$–$C_6$ alkyls, $C_2$–$C_6$ alkoxyalkyls, $C_5$–$C_8$ cycloalkyls, and the phenyl radical.

9. The composition according to claim 7, wherein the radicals Y are selected from the group consisting of hydroxyl (OH), $C_1$–$C_3$ alkoxyls ($R^1$), and mixtures thereof.

10. The composition according to claim 9, wherein the radicals Y are selected from the group consisting of hydroxyl, methoxyl, ethoxyl, and mixtures thereof.

11. The composition according to claim 6, wherein the radicals $R^2$ are selected from the group consisting of methyl, ethyl, n-propyl, isobutyl, n-butyl, n-pentyl, cyclohexyl and phenyl.

12. The composition according to claim 11, wherein the radicals $R^2$ are methyl radicals.

13. The composition according to claim 6, wherein the radical X is selected from the group consisting of radicals having the formulae (X/a), (X/b) and (X/c):

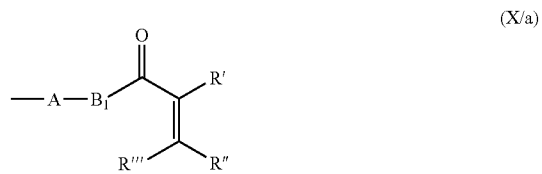

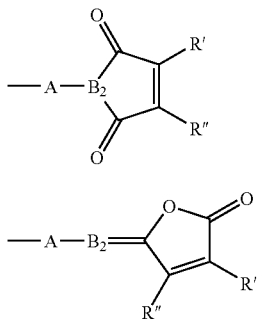

wherein $B_1$ is O, NH, N-alkyl, N-aryl, S, $CH_2$, CH-alkyl or CH-aryl;

wherein $B_2$ is N, CH, C-alkyl or C-aryl;

wherein the radicals R', R" and R'" may be identical or different and each represents hydrogen, a substituted or unsubstituted $C_1$–$C_6$ alkyl, a cyano radical, a halogen or a substituted or unsubstituted $C_6$–$C_{10}$ aryl;

wherein the radicals R" and R'" may also represent a monovalent COOH group or a derived group of the ester or amide type; and wherein A is a divalent group intended to produce the bond with the polysiloxane chain.

14. The composition according to claim 13, wherein the radical X is selected from the group consisting of radicals having the formulae (II/1), (II/2), (II/3), (II/4) and (II/5):

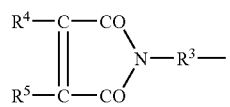

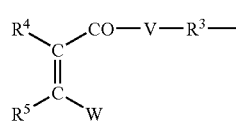

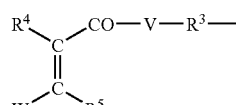

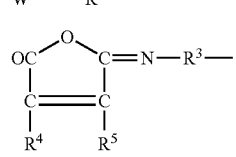

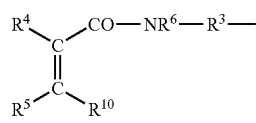

wherein V represents a divalent radical —O— or —$NR^6$—;

wherein W represents a monovalent group $COOR^7$ or a monovalent group $CONR^8R^9$;

wherein $R^3$ is a straight-chain or branched divalent alkylene radical comprising from 1 to 15 carbon atoms, the free valency of which is borne by a carbon atom and is linked to a silicon atom, said radical $R^3$ possibly being interrupted within the alkylene chain by at least one heteroatom or at least one divalent group comprising at least one heteroatom;

wherein $R^4$ and $R^5$ may be identical or different, and wherein $R^4$ and $R^5$ each represent a hydrogen atom, a halogen atom, a cyano radical or a straight-chain or branched alkyl radical having from 1 to 6 carbon atoms;

wherein $R^5$ may also represent a monovalent $COOR^7$ group; and wherein $R^6$, $R^7$, $R^8$, $R^9$ and $R^{10}$ may be identical or different and each represents a hydrogen atom, a straight-chain or branched alkyl radical having from 1 to 6 carbon atoms or a phenyl radical, and wherein $R^8$ and $R^9$ may also form together and with the nitrogen atom to which they are bonded, a single saturated ring having from 3 to 8 carbon atoms in the ring.

15. The composition according to claim 14, wherein $R^3$ represents an alkylene radical selected from the group consisting of —$(CH_2)_2$—; —$(CH_2)_3$—; —$(CH_2)_4$—; —$CH_2$—$CH(CH_3)$—; —$(CH_2)_2$—$CH(CH_3)$—$CH_2$—; —$(CH_2)_3$—O—$(CH_2)_3$—; —$(CH_2)_3$—O—$CH_2$—$CH(CH_3)$—$CH_2$—; and —$(CH_2)_3$—O—$CH_2CH(OH)$—$CH_2$—;

wherein $R^4$ and $R^5$ are selected from the group consisting of a hydrogen atom, chlorine, and the radicals methyl, ethyl, n-propyl, and n-butyl;

wherein $R^5$ may also represent a $COOR^7$ group, wherein $R^7$ represents hydrogen or methyl;

wherein $R^6$, $R^7$, $R^8$, $R^9$ and $R^{10}$ are selected from the group consisting of hydrogen and the radicals methyl, ethyl, n-propyl, and n-butyl and wherein $R^8$ and $R^9$ may also form together and with the nitrogen atom a pyrrolidinyl or piperidyl ring.

16. The composition according to claim 15, wherein $R^3$ is selected from the group consisting of —$(CH_2)_2$— and —$(CH_2)_3$—; and wherein $R^4$, $R^5$, $R^6$, $R^7$, $R^8$, $R^9$ and $R^{10}$ are each selected from the group consisting of hydrogen and methyl.

17. The composition according to claim 6, wherein the polyorganosiloxane is an essentially linear polyorganosiloxane corresponding to the following average formula (III):

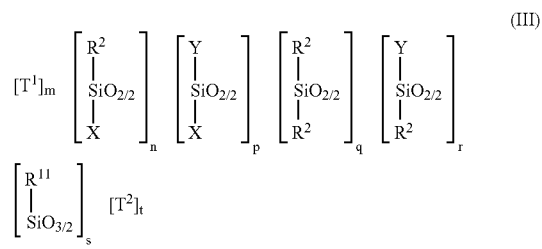

wherein $R^1$, $R^2$, X and Y are as defined above;

wherein $R^{11}$ is selected from the group consisting of $R^2$, X and Y;

wherein $T^1$ is selected from the group consisting of the units $HO_{1/2}$ and $R^1O_{1/2}$;

wherein $T^2$ may be identical to or different from $T^1$, and wherein $T^2$ is selected from the group consisting of the units $HO_{1/2}$, $R^1O_{1/2}$ and $(R^2)_3SiO_{1/2}$; and wherein m, n, p, q, r, s and t each represent integers or fractional numbers which meet the following cumulative conditions:

m and t are other than zero and their total is equal to 2+s;

n, p, q and r lie within the range from 0 to 100;
s lies within the range from 0 to 75;
when n=0, p is other than zero and when p=0, n is other than zero;
the total (n+p+q+r+s+t) lies within the range from 2 to 250;
the ratio 100 s/(n+p+q+r+s+t) is at most equal to 30;
the ratio 100 (m+pr+s[when $R^{11}$=Y]+t)/(n+p+q+r+s+t) is equal to or greater than 1; and
the ratio 100 (n+p+s[when $R^{11}$=X])/(n+p+q+r+s+t) is equal to or greater than 1.

18. The composition according to claim 17, wherein m, n, p, q, r, s and t each represent integers or fractional numbers which meet the following cumulative conditions:
the ratio 100 s/(n+p+q+r+s+t) is at most equal to 20;
the ratio 100 (m+p+r+s[when $R^{11}$=Y]+t)/(n+p+q+r+s+t) is within a range from 4 to 100; and
the ratio 100 (n+p+s[when $R^{11}$=X])/(n+p+q+r+s+t) is within a range from 2 to 100.

19. The composition according to claim 1, wherein the coupling agent is present in an amount of between 0.5% and 20% by weight relative to the amount of reinforcing inorganic filler present.

20. The composition according to claim 1, wherein the reinforcing inorganic filler comprises silica.

21. The composition according to claim 1, wherein the reinforcing inorganic filler comprises alumina.

22. The composition according to claim 1, wherein the reinforcing inorganic filler constitutes the entire reinforcing filler.

23. The composition according to claim 1, wherein the reinforcing filler comprises a mixture of the reinforcing inorganic filler and carbon black.

24. The composition according to claim 2, wherein the isoprene elastomer is selected from the group consisting of natural rubber, synthetic cis-1,4 polyisoprenes, and mixtures thereof.

25. The composition according to claim 24, wherein the isoprene elastomer is natural rubber.

26. The composition according to claim 1, further comprising a covering agent for the inorganic filler.

27. The composition according to claim 26, wherein the covering agent is a hydroxylated polyorganosiloxane.

28. The composition according to claim 27, wherein the covering agent is an α, ω-dihydroxy-polyorganosiloxane.

29. A process for preparing a sulfur-vulcanizable rubber tire elastomeric composition comprising:
incorporating into at least one isoprene elastomer, at least a reinforcing filler comprising a reinforcing inorganic filler and an (inorganic filler/isoprene elastomer) coupling agent, wherein the coupling agent is a multifunctional polyorganosiloxane comprising functions denoted as "Y" and "X", wherein the Y function is at least one hydroxyl or hydrolyzable function grafted to the silicon atoms of the coupling agent and the X function is a group bearing at least one activated ethylene double bond and is grafted to the silicon atoms of the coupling agent; and
kneading the entire mixture thermomechanically, in one or more stages, until a maximum temperature of between 110° C. and 190° C. is reached, wherein the ethylene double bond of the coupling agent is activated by at least one adjacent electron-attracting carbonyl group.

30. The process according to claim 29, wherein the polyorganosiloxane comprises siloxyl units, which may be identical or different, having the formula (I):

(I)

wherein a, b and c are each integers or fractional numbers from 0 to 3;
wherein the radicals $R^2$ may be identical or different and each represent a monovalent hydrocarbon radical;
wherein the radicals Y may be identical or different and each represent the hydroxyl or hydrolyzable function;
wherein the radicals X may be identical or different and each represent the group bearing at least one activated ethylene double bond;
wherein 0<(a+b+c)≦3; and
wherein at least one radical X and at least one radical Y are present in the polyorganosiloxane.

31. The process according to claim 30, wherein the radicals $R^2$ are selected from the group consisting of methyl, ethyl, n-propyl, isopropyl, n-butyl, n-pentyl, cyclohexyl and phenyl.

32. The process according to claim 30, wherein the radicals Y are selected from the group consisting of hydroxyl, methoxyl, ethoxyl, and mixtures thereof.

33. The process according to claim 30, wherein the radical X is selected from the group consisting of radicals having the following formulae (X/a), (X/b) and (X/c):

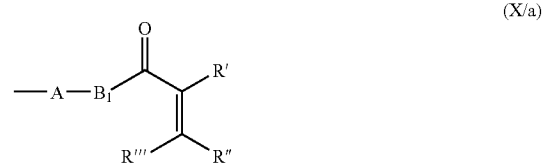

(X/a)

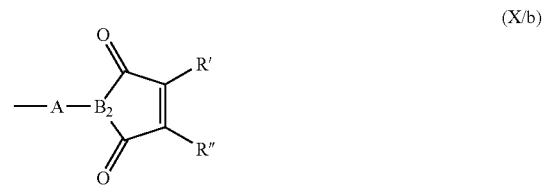

(X/b)

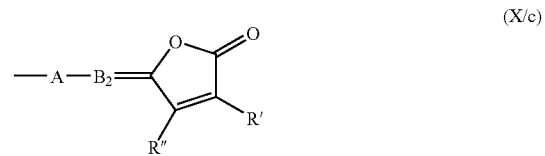

(X/c)

wherein $B_1$ is o, NH, N-alkyl, N-aryl, S, $CH_2$, CH-alkyl or CH-aryl;
wherein $B_2$ is N, CH, C-alkyl or C-aryl;
wherein the radicals R', R" and R'" may be identical or different and wherein each represents hydrogen, a substituted or unsubstituted $C_1$–$C_6$ alkyl, a cyano radical, a halogen, or a substituted or unsubstituted $C_6$–$C_{10}$ aryl;
wherein the radicals R" and R'" may also represent a monovalent COOH group or a derived group of the ester or amide type; and
wherein A is a divalent group intended to produce the bond with the polysiloxane chain.

34. The process according to claim 33, wherein the radical X is selected from the group consisting of radicals having the formulae (II/1), (II/2), (II/3), (II/4), and (II/5):

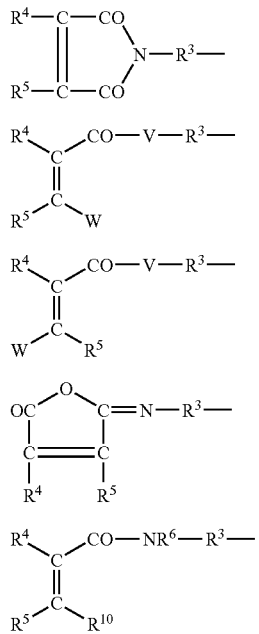

wherein V represents a divalent radical —O— or —NR$^6$—;

wherein W represents a monovalent group COOR$^7$ or a monovalent group CONR$^8$R$^9$;

wherein R$^3$ is a straight-chain or branched divalent alkylene radical comprising from 1 to 15 carbon atoms, the free valency of which is borne by a carbon atom and is linked to a silicon atom, said radical R$^3$ possibly being interrupted within the alkylene chain by at least one heteroatom or at least one divalent group comprising at least one heteroatom;

wherein R$^4$ and R$^5$ may be identical or different and each represents a hydrogen atom, a halogen atom, a cyano radical or a straight-chain or branched alkyl radical having from 1 to 6 carbon atoms, and wherein R$^5$ may also represent a monovalent COOR$^7$ group; and wherein R$^6$, R$^7$, R$^8$, R$^9$ and R$^{10}$ may be identical or different and each represents a hydrogen atom, a straight-chain or branched alkyl radical having from 1 to 6 carbon atoms or a phenyl radical, and wherein R$^8$ and R$^9$ may also form together and with the nitrogen atom to which they are bonded, a single saturated ring having from 3 to 8 carbon atoms in the ring.

35. The process according to claim 34, wherein R$^3$ is selected from the group consisting of —(CH$_2$)$_2$— and —(CH$_2$)$_3$— and wherein R$^4$, R$^5$, R$^6$, R$^7$, R$^8$, R$^9$ and R$^{10}$ are each selected from the group consisting of hydrogen and methyl.

36. The process according to claim 30, in which the polyorganosiloxane is an essentially linear polyorganosiloxane corresponding to the following average formula (III):

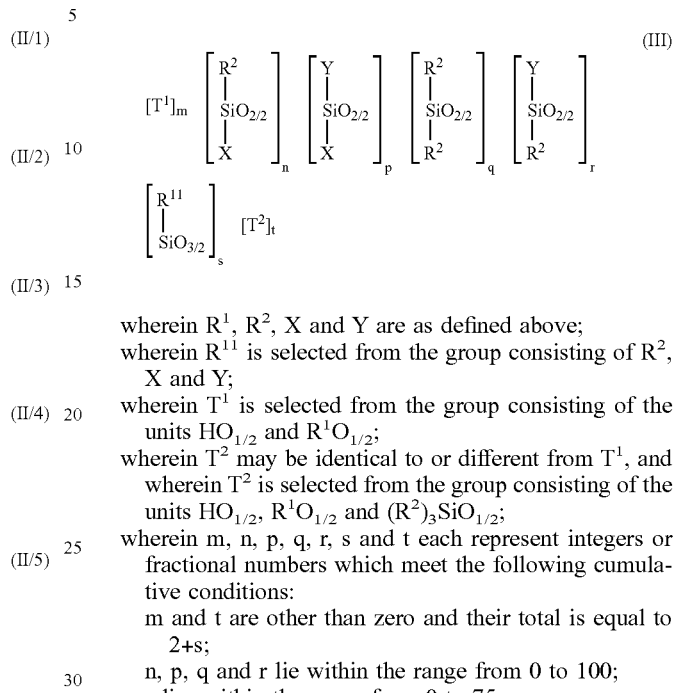

wherein R$^1$, R$^2$, X and Y are as defined above;

wherein R$^{11}$ is selected from the group consisting of R$^2$, X and Y;

wherein T$^1$ is selected from the group consisting of the units HO$_{1/2}$ and R$^1$O$_{1/2}$;

wherein T$^2$ may be identical to or different from T$^1$, and wherein T$^2$ is selected from the group consisting of the units HO$_{1/2}$, R$^1$O$_{1/2}$ and (R$^2$)$_3$SiO$_{1/2}$;

wherein m, n, p, q, r, s and t each represent integers or fractional numbers which meet the following cumulative conditions:

m and t are other than zero and their total is equal to 2+s;

n, p, q and r lie within the range from 0 to 100;

s lies within the range from 0 to 75;

when n=0, p is other than zero and when p=0, n is other than zero;

the total (n–f–p+q+r+s+t) lies within the range from 2 to 250;

the ratio 100 s/(n+p+q+r+s+t) is at most equal to 30;

the ratio 100 (m+p+r+s[when R$^{11}$=Y]+t)/(n+p+q+r+s+t) is equal to or greater than 1; and the ratio 100 (n+p+s[when R$^{11}$=X])/(n+p+q+r+s+t) is equal to or greater than 1.

37. The process according to claim 36, wherein m, n, p, q, r, s and t each represent integers or fractional numbers which meet the following cumulative conditions:

the ratio 100 s/(n+p+q+r+s+t) is at most equal to 20;

the ratio 100 (m+p+r+s[when R$^{11}$=Y]+t)/(n+p+q+r+s+t) is within a range from 4 to 100; and the ratio 100 (n+p+s[when R$^{11}$=X])/(n+p+q+r+s+t) is within a range from 2 to 100.

38. The process according to claim 29, wherein the isoprene elastomer is selected from the group consisting of natural rubber, synthetic polyisoprenes, isoprene copolymers, and mixtures thereof.

39. The process according to claim 29, wherein the coupling agent is present in an amount greater than 0.5 parts by weight per one hundred parts of elastomer.

40. The process according to claim 39, wherein the coupling agent is present in an amount of between 2 and 10 parts by weight per one hundred parts of elastomer.

* * * * *